US010528711B2

(12) United States Patent
Lee et al.

(10) Patent No.: US 10,528,711 B2
(45) Date of Patent: Jan. 7, 2020

(54) METHOD FOR PROCESSING FINGERPRINT AND ELECTRONIC DEVICE THEREFOR

(71) Applicant: Samsung Electronics Co., Ltd., Suwon-si, Gyeonggi-do (KR)

(72) Inventors: Seung-Eun Lee, Seoul (KR); Bo-Yeon Na, Yongin-si (KR); Cheol-Ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 14/708,771

(22) Filed: May 11, 2015

(65) Prior Publication Data

US 2015/0324570 A1 Nov. 12, 2015

(30) Foreign Application Priority Data

May 9, 2014 (KR) ........................ 10-2014-0055688

(51) Int. Cl.
*G05B 19/00* (2006.01)
*G06F 21/32* (2013.01)
*G06K 9/00* (2006.01)
*G06K 9/32* (2006.01)

(52) U.S. Cl.
CPC ......... *G06F 21/32* (2013.01); *G06K 9/00026* (2013.01); *G06K 9/00067* (2013.01); *G06K 9/00087* (2013.01); *G06K 9/3208* (2013.01); *G06K 9/3216* (2013.01); *G06K 2009/3225* (2013.01); *G06K 2009/3291* (2013.01); *G06K 2209/05* (2013.01)

(58) Field of Classification Search
CPC ............. G06F 21/32; G06F 2203/0338; G06F 3/0416; G06F 1/163; G06F 21/31; G06F 2200/1614; G06F 2200/1637; G06F 3/017; G06F 3/0346; G06F 3/0412; G06F 3/0488; G06K 9/3208; G06K 9/00006; G06K 9/0008
USPC ......................................... 340/5.8
See application file for complete search history.

(56) References Cited

U.S. PATENT DOCUMENTS

| 9,049,983 | B1 * | 6/2015 | Baldwin | G06F 21/32 |
| 9,928,379 | B1 * | 3/2018 | Hoffer | G06F 21/6245 |
| 2007/0047785 | A1 | 3/2007 | Jang et al. | |
| 2008/0091639 | A1 * | 4/2008 | Davis | G06Q 30/02 |
| 2009/0058598 | A1 * | 3/2009 | Sanchez Sanchez | G06F 21/32 340/5.83 |
| 2010/0237991 | A1 * | 9/2010 | Prabhu | G06F 3/03547 340/5.83 |
| 2011/0202453 | A1 * | 8/2011 | Issa | G06Q 10/00 705/39 |

(Continued)

FOREIGN PATENT DOCUMENTS

KR 10-2007-0023217 A 2/2007

*Primary Examiner* — Vernal U Brown
*Assistant Examiner* — Renee Dorsey
(74) *Attorney, Agent, or Firm* — Jefferson IP Law, LLP

(57) ABSTRACT

A method for operating an electronic device is provided. The method includes detecting a fingerprint, detecting reference value based on situation information of the electronic device, and performing a fingerprint recognition based on the detected fingerprint and the reference value. A method for operating an electronic device is not limited to the above method, and other embodiments are possible within the same or similar scope as the present disclosure.

15 Claims, 15 Drawing Sheets

(56) References Cited

U.S. PATENT DOCUMENTS

| | | | |
|---|---|---|---|
| 2012/0288169 A1* | 11/2012 | Kim | G06K 9/0002 |
| | | | 382/124 |
| 2012/0331549 A1* | 12/2012 | Gunnewig | H04L 9/3226 |
| | | | 726/19 |
| 2014/0041020 A1* | 2/2014 | Zhao | G06F 21/36 |
| | | | 726/19 |
| 2014/0176332 A1* | 6/2014 | Alameh | G06F 21/32 |
| | | | 340/665 |
| 2014/0181959 A1* | 6/2014 | Li | G06F 21/32 |
| | | | 726/19 |
| 2014/0302818 A1* | 10/2014 | Fyke | G06F 21/32 |
| | | | 455/411 |
| 2015/0123889 A1* | 5/2015 | Willis | G06F 3/013 |
| | | | 345/156 |
| 2015/0186705 A1* | 7/2015 | Magi | G06K 9/0002 |
| | | | 382/125 |
| 2015/0278577 A1* | 10/2015 | Cho | G06F 3/041 |
| | | | 382/124 |
| 2015/0294516 A1* | 10/2015 | Chiang | G07C 9/00158 |
| | | | 340/5.83 |

* cited by examiner

METHOD FOR PROCESSING FINGERPRINT AND ELECTRONIC DEVICE THEREFOR

CROSS-REFERENCE TO RELATED APPLICATION(S)

This application claims the benefit under 35 U.S.C. § 119(a) of a Korean patent application filed on May 9, 2014 in the Korean Intellectual Property Office and assigned Serial number 10-2014-0055688, the entire disclosure of which is hereby incorporated by reference.

TECHNICAL FIELD

The present disclosure relates to a method for recognizing a detected fingerprint and to an electronic device therefor.

BACKGROUND

To provide a fingerprint recognition function in an electronic device, in general, the fingerprint of at least one finger chosen by a user is input into the electronic device, and the electronic device registers the input fingerprint as a reference fingerprint or registers and saves feature information extracted from the reference fingerprint. Since the deformation of a fingerprint may be observed in fingerprint images depending on the condition of the skin, the force with which the finger is pressed against the surface, and the like, a plurality of reference fingerprint images or a plurality of pieces of feature information may be recorded by scanning one fingerprint several times so as to address various types of deformation.

In the case of a scanner type sensor in the form of a band (or bar) over which a finger is swiped, the band is typically arranged in the transverse direction, and a fingerprint pattern is input by swiping a finger in the direction orthogonal to the transverse direction, that is, in the up-to-down direction. Accordingly, in order to facilitate fingerprint recognition, the direction in which a finger is swiped, that is, the input direction, must be the same both when a fingerprint is input for reference fingerprint registration and when a fingerprint is input for user authentication.

Likewise, in the case of using other types of sensors, fingerprint registration is performed in a normal direction, and subsequently user authentication is also performed in the same manner by recognizing the fingerprint of the corresponding finger in the normal direction through a fingerprint recognition device. That is, when a new fingerprint is saved or registered, a finger is placed or dragged in a predetermined normal direction (e.g., vertical direction), and also when a fingerprint is input for user authentication, the fingerprint must be input using the same finger action and direction as in the fingerprint registration in order to increase the recognition rate and reduce malfunctioning. Further, when a fingerprint is registered and saved as a reference fingerprint, a large number of similarly registered and saved fingerprints are generated because fingerprint registration is repeatedly performed for several fingers in order to increase the fingerprint authentication success rate.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for recognizing a detected fingerprint and to an electronic device therefor.

The fingerprint recognition technology has a problem when fingerprint recognition is employed in a mobile device that is controllable with one hand, such as a cell phone, according to the related art. For example, when a reference fingerprint is registered, a user may input the fingerprint of his/her right hand thumb in a normal direction while holding the cell phone in his/her left hand. In contrast, there is the case where a user inputs the fingerprint of his/her right hand thumb while holding the cell phone in his/her right hand in order to perform the user authentication through fingerprint recognition. In this case, since fingerprint input for the user authentication is different in the finger action or fingerprint input direction from the fingerprint input for the reference fingerprint registration, features of the input fingerprints may be different, which leads to a reduction in the fingerprint recognition rate and the frequent occurrence of recognition errors. In conclusion, there is a difficulty in that a user must input the fingerprint of a finger of one hand while holding the terminal in the other hand or must input a fingerprint while putting the terminal down on a flat surface in order to perform the fingerprint input in the same direction as a normal direction (e.g., vertical direction) taken when fingerprint registration was done. Further, when a plurality of users use one and the same device, the number of registered fingerprints increases rapidly compared to the amount of fingerprint information for one user. Accordingly, if an authentication process with a plurality of registered fingerprints for the respective fingers of a plurality of users is performed by fingerprint information input for user authentication, then it is obvious that a reduction in processing speed, as well as a reduction in recognition rate, is caused.

In accordance with an aspect of the present disclosure, when a user performs user authentication through fingerprint recognition in an electronic device, the electronic device detects at least one of information on the direction of the electronic device and information on the movement of the electronic device based on the grip pattern in which the user holds the electronic device. The electronic device predicts at least one of a finger and an input direction that may be used to input a fingerprint for the user authentication using the detected at least one of information on the direction and information on the movement. The electronic device determines the priorities of fingerprint candidates based on the predicted information or extracts at least one fingerprint candidate based on the predicted information. In this way, authentication errors may be reduced because the fingerprint recognition rate is increased, and among a large number of registered fingerprints to be compared, fingerprint candidates with higher priorities or fingerprint candidates of a specific candidate group may be preferentially compared with the input fingerprint.

In accordance with another aspect of the present disclosure, a method for operating an electronic device is provided. The method includes detecting a fingerprint, detecting a reference value based on situation information of the electronic device, and performing a fingerprint recognition based on the detected fingerprint and the reference value.

In accordance with another aspect of the present disclosure, an electronic device is provided. The electronic device includes a fingerprint recognition sensor configured to detect a fingerprint, and a processor configured to detect a reference value based on situation information of the electronic device, and perform a fingerprint recognition based on the detected fingerprint and the reference value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
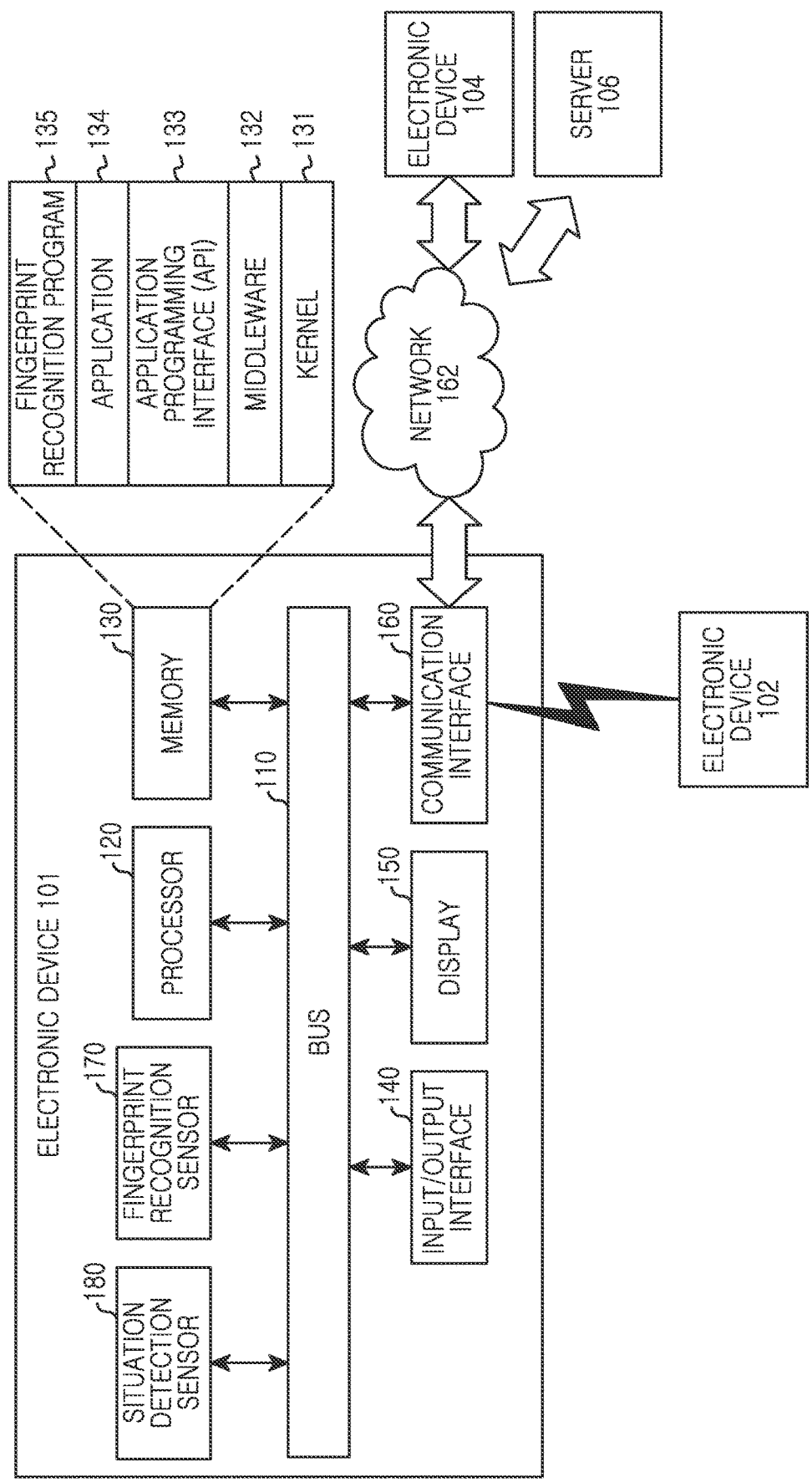
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in various embodiments of the present disclosure, the expression "include" or "may include" refers to the existence of a corresponding function, operation, or element, and does not exclude one or more additional functions, operations, or elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of the addition of one or more other features, numerals, steps, operations, elements, components, or combinations thereof.

Further, as used in various embodiments of the present disclosure, the expression "or" includes any or all combinations of words enumerated together. For example, the expression "A or B" may include A, B, or both A and B.

As used in various embodiments of the present disclosure, the expression "first", "second", or the like may modify various elements in the present disclosure, but does not limit the sequence and/or importance of corresponding elements. The above expressions may also be used for the purpose of distinguishing one element from other elements.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well unless the context explicitly indicates otherwise. Further, all the terms used herein, including technical terms and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device including a communication function. The electronic device according to various embodiments of the present disclosure may, for example, include at least one of: a smart phone; a tablet personal computer (PC); a mobile phone; a video phone; an e-book reader; a desktop PC; a laptop PC; a netbook computer; a personal digital assistant (PDA); a portable multimedia player (PMP); a Moving Picture Experts Group (MPEG-1 or MPEG-2) Audio Layer III (MP3) player; a mobile medical device; a camera; a wearable device (e.g., a head-mount-device (HMD) such as electronic glasses, electronic clothing, an electronic bracelet, an electronic necklace, an electronic appcessory, an electronic tattoo, or a smart watch); a television; a digital video disc (DVD) player; an audio; a refrigerator; an air conditioner; a vacuum cleaner; an oven; a microwave oven; a washing machine; an air cleaner; a set-top box; a television (TV) box (e.g., Samsung HomeSync™, Apple TV™, or Google TV™); a game console; an electronic dictionary; an electronic key; a camcorder; medical equipment (e.g., a magnetic resonance angiography (MRA) machine, a magnetic resonance imaging (MRI) machine, a computed tomography (CT) scanner, or an ultrasonic machine); a navigation device; a global positioning system (GPS) receiver; an event data recorder (EDR); a flight data recorder (FDR); an in-vehicle infotainment device; electronic equipment for a ship (e.g., ship navigation equipment and a gyrocompass); avionics; security equipment; an industrial or home robot; a part of furniture or a building/structure; an electronic board; an electronic signature receiving device; a projector; and various measuring instruments (e.g., a water meter, an electricity meter, a gas meter, or a wave meter), each of which includes a communication function. The electronic device according to various embodiments of the present disclosure may be a combination of one or more of the above-mentioned various devices. Further, it will be apparent to those skilled in the art that the electronic device according to various embodiments of the present disclosure is not limited to the above-mentioned devices.

Hereinafter, an electronic device according to the various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 illustrates a network environment including an electronic device according to various embodiments of the present disclosure.

Referring to FIG. 1, an electronic device 101 may include at least one of a bus 110, a processor 120, a memory 130, an input/output interface 140, a display 150, and a communication interface 160, but is not limited thereto.

The bus 110 may be a circuit that interconnects the above-mentioned elements and transmits communication signals (e.g., control messages) between the above-mentioned elements.

The processor 120 may, for example, receive commands from the above-mentioned other elements (e.g., the memory 130, the input/output interface 140, the display 150, and the communication interface 160) via the bus 110, interpret the received commands, and perform calculations or data processing according to the interpreted commands.

At least one processor 120 may be included in the electronic device 101 so as to perform predetermined functions of the electronic device 101. According to an embodiment of the present disclosure, the processor 120 may include at least one application processor (AP) and at least one micro controller unit (MCU). According to another embodiment of the present disclosure, the processor 120 may include at least one MCU as an application or may be functionally connected to at least one MCU. Referring to FIG. 1, the AP and the MCU may be incorporated into one integrated circuit (IC) package or may be separately included in different IC packages. According to an embodiment of the present disclosure, one IC package may be implemented by including the MCU in the IC package of the AP. Although FIG. 1 shows the AP or MCU as being included as an element of the processor 120, this is merely an example for providing a better understanding of the present disclosure and it will be apparent that the processor 120 may serve as the AP and/or the MCU.

The AP may control a plurality of hardware or software components connected to the AP by driving an operating system or an application program (or application) and may process and calculate various data including multimedia data. The AP may, for example, be implemented as a system on chip (SoC). According to an embodiment of the present disclosure, the processor 120 may further include a graphic processing unit (GPU) (not shown).

The MCU may be a processor configured to perform predetermined operations. According to an embodiment of the present disclosure, the MCU may acquire sensing information through at least one specified motion sensor (e.g., a gyro sensor, an acceleration sensor, or a geomagnetic sensor), compare the acquired sensing information, and determine the operational state of the specified motion sensor by making reference to a database of the electronic device 101.

According to an embodiment of the present disclosure, the AP or the MCU may load a command or data received from at least one of a non-volatile memory and other elements connected to each of the AP and the MCU into a volatile memory and may process the loaded command or data. Further, the AP or the MCU may store data received from or generated by at least one of other elements in a non-volatile memory.

The memory 130 may store commands or data received from the processor 120 or other elements (e.g., the input/output interface 140, the display 150, and the communication interface 160) or generated by the processor 120 or other elements. The memory 130 may include programming modules, for example, a kernel 131, middleware 132, an application programming interface (API) 133, an application 134, and the like. Each of the above-mentioned programming modules may be implemented by software, firmware, hardware, or any combination of two or more thereof.

The kernel 131 may control or manage system resources (e.g., the bus 110, the processor 120, or the memory 130) that are used to perform operations or functions implemented in all the other programming modules, for example, the middleware 132, the API 133, or the application 134. Further, the kernel 131 may provide an interface through which the middleware 132, the API 133, or the application 134 may access each element of the electronic device 101 so as to control or manage the element.

The middleware 132 may act as an intermediary so as to allow the API 133 or the application 134 to communicate and exchange data with the kernel 131. Further, for operation requests received from the application 134, the middleware 132 may control the operation requests (e.g., perform scheduling or load balancing) using, for example, a method of prioritizing at least one application of the application 134 in using system resources (e.g., the bus 110, the processor 120, or the memory 130) of the electronic device 101.

The API 133 corresponds to an interface used by the application 134 to control a function provided by the kernel 131 or the middleware 132 and may, for example, include at least one interface or function (e.g., instruction) for controlling files, controlling windows, processing images, controlling texts, and others.

The applications 134 may include a short message service (SMS)/multimedia message service (MMS) application, an e-mail application, a calendar application, an alarm application, a health care application (e.g., application for monitoring physical activity or blood glucose), and an environmental information application (e.g., application for providing atmospheric pressure, humidity, or temperature information). The application 134 may correspond to an application associated with information exchange between the electronic device 101 and an external electronic device (e.g. an external electronic device 102 or another external electronic device 104). The application associated with information exchange may, for example, include a notification relay application for notifying an external electronic device of certain information or a device management application for managing an external electronic device. The notification relay application may, for example, include a function of transferring, to an external electronic device (e.g., the other external electronic device 104), notification information generated by other applications (e.g., an SMS/MMS application, an e-mail application, a health management application, or an environmental information application) of the electronic device 101. Additionally or alternatively, the notification relay application may, for example, receive notification information from an external electronic device (e.g., the other external electronic device 104) and may provide the received notification information to a user. The device management application may, for example, manage (e.g., install, delete, or update) functions for at least a part of an external electronic device (e.g., the other external electronic device 104) communicating with the electronic device 101 (e.g., a function of turning on/off the external electronic device itself (or some components thereof) or a function of adjusting the brightness (or resolution) level of the display), applications operated in the external electronic device, or services (e.g., a telephone call service or a message service) provided by the external electronic device. According to various embodiments of the present disclosure, the application 134 may include an application that is specified according to the attributes (e.g., the type of electronic device) of an external electronic device (e.g., the external electronic device 102 or the other external electronic device 104). For example, when an external electronic device is an MP3 player, the application 134 may include an application associated with music playback. Likewise, when an external electronic device is a mobile medical appliance, the application 134 may include an application associated with health care. According to an embodiment of the present disclosure, the application 134 may include at least one of an application specified for the electronic device 101 and an application received from an external electronic device (e.g., the server 106 or the other external electronic device 104). A fingerprint recognition program 135 is provided, which may be included in the application 134 or may be stored as a separate program in the memory 130.

Under the control of the processor 120, the fingerprint recognition program 135 may recognize a fingerprint detected through a fingerprint recognition sensor 170 by controlling at least one device functionally connected to the electronic device. The operation of the fingerprint recognition program 135 as described below may be performed under the control of the processor 120.

The fingerprint recognition program 135 may determine comparison reference value information based on situation information at a time when a fingerprint is detected and may recognize a fingerprint corresponding to the detected fingerprint according to the comparison reference value information. The fingerprint recognition program 135 may determine a predefined mode as the situation information based on at least one of information on the motion of the electronic device, information on the posture of the electronic device, and information on the movement of the electronic device or based on the motion, posture, and movement of the electronic device. The fingerprint recognition program 135 may acquire the information on the motion of the electronic device, the information on the posture of the electronic device, or the information on the movement of the electronic device through at least one of an acceleration sensor, a tilt sensor, a gesture sensor, a gyro sensor, a grip sensor, a touch sensor, a light sensor, and a biometric sensor included in the electronic device. The fingerprint recognition program 135 may determine, as the situation information, information on the orientation of the hand grasping the electronic device or information on the position where the electronic device is worn on a user's body. The fingerprint recognition program 135 may determine the orientation of the grasping hand or the wearing position of the electronic device based on the movement of the electronic device through at least one of an acceleration sensor, a tilt sensor, a gesture sensor, a gyro sensor, a grip sensor, a touch sensor, a light sensor, and a biometric sensor included in the electronic device or based on a biometric sensor included in the electronic device. The fingerprint recognition program 135 may allow the situation information to include information determined for the orientation of a user's hand with which the user inputs the detected fingerprint. The fingerprint recognition program 135 may determine the information determined for the orientation of a user's hand based on information on the motion, posture, or movement of the electronic device. The fingerprint recognition program 135 may allow the comparison reference value to include information on images of at least one fingerprint stored before the detection time of the fingerprint or information on at least one category including the fingerprint images. In the case of a swipe type fingerprint recognition sensor, the fingerprint recognition program 135 may identify the category based on at least one of the direction in which a user swipes his/her finger, the orientation of a user's hand with which the user inputs a fingerprint, and the finger of which fingerprint is input. In the case of a touch type fingerprint recognition sensor, the fingerprint recognition program 135 may identify the category based on at least one of the orientation of the fingertip, the orientation of a user's hand with which the user inputs a fingerprint, and the finger of which fingerprint is input. The fingerprint recognition program 135 may determine the priorities of the fingerprint images or the categories and may allow the comparison reference value information to include the determined priorities.

The input/output interface 140 may, for example, transfer a command or data input by a user through an input/output unit (e.g., various sensors such as an acceleration sensor and a gyro sensor and/or a device such as a keyboard or a touch screen) to the processor 120, the memory 130, or the communication interface 160 via the bus 110. The input/output interface 140 may, for example, provide the processor 120 with data corresponding to a user's touch input through a touch screen. Further, the input/output interface 140 may, for example, output a command or data received from the processor 120, the memory 130, or the communication interface 160 via the bus 110 through an output unit (e.g., speaker or display). The input/output interface 140 may, for example, output voice data processed by the processor 120 to a user through a speaker.

The display 150 may display various pieces of information (e.g., multimedia data or text data) to a user. Further, the display 150 may be implemented as a touch screen into which a command is input when an input means touches or hovers over the display.

The communication interface 160 (e.g., the communication module 220) may establish a communication connect between the electronic device 101 and an external device (e.g., the other external electronic device 104 or the server 106). The communication interface 160 may, for example, be connected to a network 162 through wireless communication or wired communication and may communicate with an external device. The wireless communication may, for example, include at least one of Wi-Fi, Bluetooth (BT), near field communication (NFC), global positioning system (GPS), and cellular communication (e.g., long term evolution (LTE), LTE-advanced (LTE-A), code division multiple access (CDMA), wideband code division multiple access (WCDMA), universal mobile telecommunications system (UMTS), wireless broadband (WiBro), or global system for mobile (GSM)). The wired communication may, for example, include at least one of a universal serial bus (USB), a high definition multimedia interface (HDMI), the recommended standard 232 (RS-232), and a plain old telephone service (POTS).

The fingerprint recognition sensor 170 may be included in a predetermined place of the electronic device 101 and may perform an operation of acquiring a fingerprint corresponding to the fingerprint side of a user's finger. The fingerprint recognition sensor 170 may be in the form of a band so as to acquire a fingerprint through a user's action of swiping his/her finger over the sensor, may have at least a certain area so as to acquire a fingerprint corresponding to the contact area of a finger placed on the sensor, or may optically acquire an image of a fingerprint that is placed in proximity to the sensor. The fingerprint recognition sensor 170 may detect a fingerprint input through a fingerprint recognition sensor 301 (see FIG. 3) included in a predetermined place of the electronic device 101 or a fingerprint recognition unit (or fingerprint recognition region; hereinafter may also be referred to as "fingerprint recognition sensor" to unify the terms) that is implemented as an in-cell type in the display 150. According to an embodiment of the present disclosure, the fingerprint recognition sensor 170 may be at least one of an optical sensor, a thermal sensor, a capacitive sensor, an electric field sensor, and a semiconductor sensor. The optical sensor uses an internal light source that irradiates light to the fingerprint portion of a finger and a Complementary Metal-Oxide Semiconductor (CMOS) image sensor that captures the image reflected from the fingerprint portion by the light. The thermal sensor has a small size and operates to acquire a fingerprint image using the temperature differences between the touching-ridges and the non-touching valleys of the fingerprint. The sensor unit is in the form of a small bar and may acquire the entire fingerprint image by a user's action of swiping his/her finger over the sensor surface. The capacitive sensor acquires a fingerprint image using the differences between electricity charged by the touching-ridges and electricity charged by the non-touching valleys of the fingerprint. The electric field sensor acquires a fingerprint image by creating an electric field around the sensor unit, detecting the changes in the electric field when the ridges of the fingerprint come in contact with the sensor unit, and converting the detected changes into a fingerprint image. The electric field sensor is characterized in that the electric field sensor strongly prevents contamination occurring on the surface of a fingerprint. The semiconductor sensor uses a sensor unit connected to an opaque plate.

When the front surface is defined by the surface of the electronic device 101 where the display 150 is included, the fingerprint recognition sensor 170 may be included in at least one of the front surface, side surfaces (e.g., upper side surface, lower side surface, left side surface, and right side surface), and the rear surface of the electronic device 101. The fingerprint recognition sensor 170 included in the electronic device 101 may compose, combine, merge, or modify at least two images acquired in the form of a band into a finished fingerprint when a user swipes his/her finger over the fingerprint recognition sensor 301 in a certain direction or may determine a finished fingerprint by acquiring at least one image of the finger surface that comes in contact with the fingerprint recognition sensor (not shown) or by acquiring at least two images of the finger surface that comes in contact with the fingerprint recognition sensor and composing, combining, merging, or modifying the acquired images into a finished image when a user touches the fingerprint recognition sensor with his/her finger. In addition, when the fingerprint recognition sensor 170 is incorporated in the display 150 of the electronic device 101 (e.g., in the case of an in-cell type fingerprint recognition unit), the electronic device 101 may activate the fingerprint recognition sensor 170 corresponding to a predetermined region of the display 150. The electronic device 101 may determine a finished fingerprint by acquiring at least one image corresponding to the finger surface that comes in contact with or comes in proximity to the fingerprint recognition sensor 170 or may determine a finished fingerprint by acquiring at least two images of the finger surface that comes in contact with or comes in proximity to the fingerprint recognition sensor and composing, combining, merging, or modifying the acquired images into a finished image.

A situation detection sensor 180 may acquire information on the motion, gesture, or movement of the electronic device 101 through a sensor module including at least one sensor included in the electronic device 101. The sensor included in the electronic device 101 may include at least one of a gesture sensor, a gyro sensor, an atmospheric pressure sensor, an acceleration sensor, a proximity sensor, a grip sensor, a touch sensor, a biometric sensor, a geomagnetic sensor, and an image sensor. The situation detection sensor 180 may acquire, through the sensor module, information on the grip pattern in which a user holds the electronic device 101 and information on the motion, gesture, or movement of the electronic device 101 at a time when the fingerprint recognition sensor 170 detects a fingerprint.

According to an embodiment of the present disclosure, the network 162 may be a telecommunication network. The communication network may include at least one of a computer network, the Internet, the Internet of things, or a telephone network. According to an embodiment of the present disclosure, at least one of the application 134, the application programming interface 133, the middleware 132, the kernel 131, and the communication interface 160 may support a protocol (e.g., transport layer protocol, data link layer protocol, or physical layer protocol) for communication between the electronic device 101 and an external device.

According to an embodiment of the present disclosure, the server 106 may support to drive the electronic device 101 by performing at least one operation (or function) implemented in the electronic device 101. The server 106 may, for example, include a server module (or server processor; not shown) capable of supporting the processor 120 that controls the electronic device 101 to implement various embodiments of the present disclosure as described below or a particular module specified to implement the various embodiments of the present disclosure. The server module may, for example, include at least one of the elements of the processor 120 or the particular module and may perform (e.g., perform in place of the processor 120 or the particular module) at least one of the operations performed by the processor 120 or the particular module. The server module may be included in the server 106.

Figure 2:
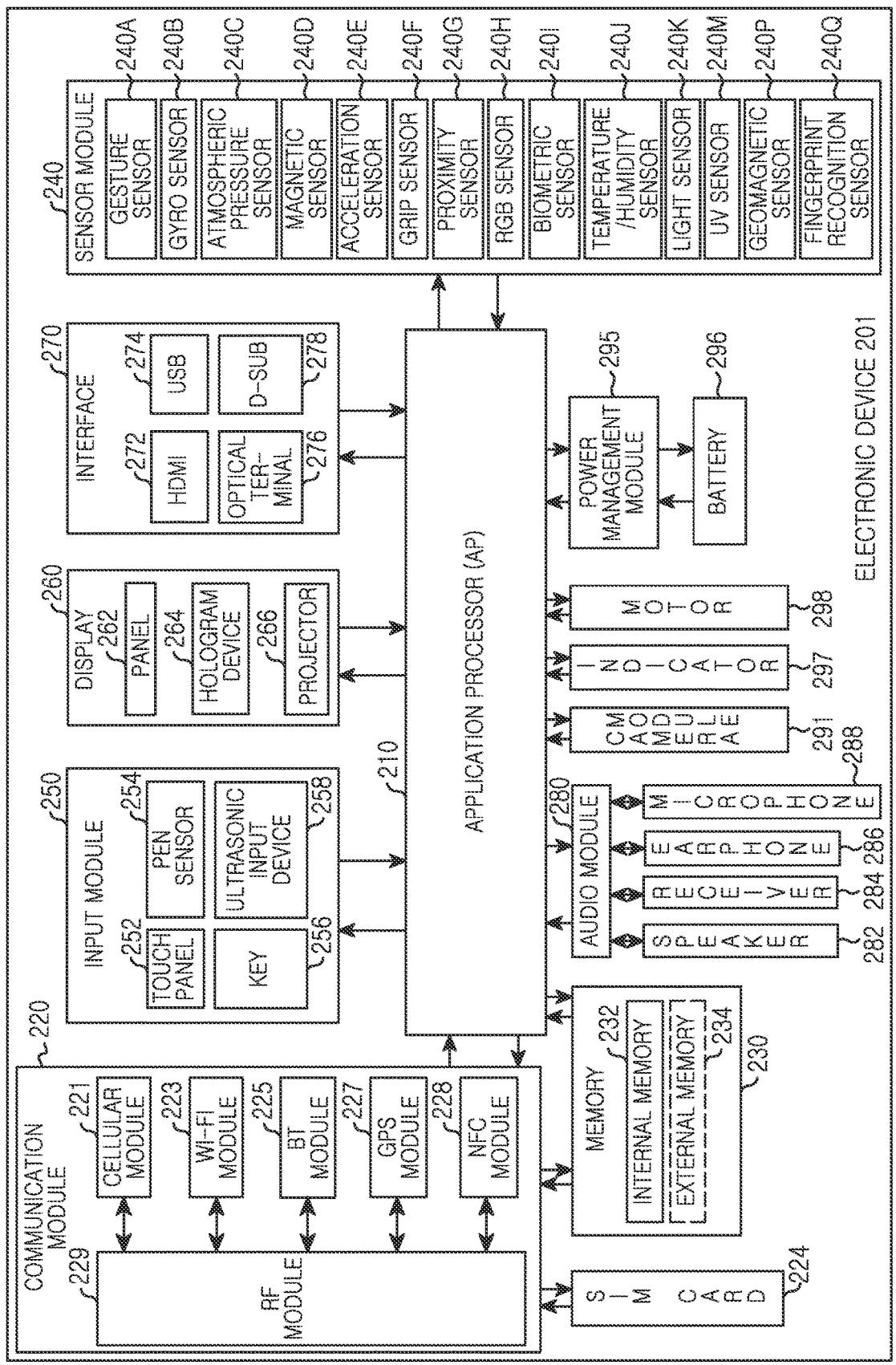
FIG. 2 is a block diagram illustrating an electronic device according to various embodiments of the present disclosure.

FIG. 2 illustrates a block diagram of an electronic device according to various embodiments of the present disclosure.

Referring to FIG. 2, an electronic device 201 may, for example, constitute all or some elements of the electronic device 101 shown in FIG. 1 or extend all or some elements of the electronic device 101. The electronic device 201 may include at least one processor 210, a communication module 220, a subscriber identification module (SIM) card 224, a memory 230, a sensor module 240, an input module 250, a display 260, an interface 270, an audio module 280, a camera module 291, a power management module 295, a battery 296, an indicator 297, and a motor 298, but is not limited thereto.

At least one processor 210 may be included in the electronic device 101 so as to perform predetermined functions of the electronic device 101. According to an embodiment of the present disclosure, the processor 210 may include at least one AP and at least one MCU. According to another embodiment of the present disclosure, the processor 120 may include at least one MCU as an application or may be functionally connected to at least one MCU. Referring to FIG. 1, the AP and the MCU may be incorporated into one IC package or may be separately included in different IC packages. According to an embodiment of the present disclosure, one IC package may be implemented by including the MCU in the IC package of the AP. Although FIG. 2 shows the AP or MCU as being included as an element of the processor 210, this is merely an example for providing a better understanding of the present disclosure and it will be apparent that the processor 210 may serves as the AP and/or the MCU.

The AP may control a plurality of hardware or software components connected to the AP by driving an operating system or an application program (or application) and may process and calculate various data including multimedia data. The AP may, for example, be implemented as a system on chip (SoC). According to an embodiment of the present disclosure, the processor 210 may further include a graphic processing unit (GPU; not shown).

The MCU may be a processor configured to perform predetermined operations. According to an embodiment of the present disclosure, the MCU may acquire sensing information through at least one predetermined motion sensor (e.g., gyro sensor 240B, acceleration sensor 240E, or geomagnetic sensor 240P), compare the acquired sensing information, and determine the operational state of the predetermined motion sensor (e.g., gyro sensor 240E) by making reference to a database of the electronic device 201. Although FIG. 2 shows the elements of the sensor module 240 as being separate from the MCU, according to an embodiment of the present disclosure, the MCU may be implemented to include at least some of the above elements of the sensor module 240 (e.g., at least one of a gyro sensor 240B, an acceleration sensor 240E, and an geomagnetic sensor 240P).

According to an embodiment of the present disclosure, the AP or the MCU may load a command or data received from at least one of a non-volatile memory and other elements connected to each of the AP and the MCU into a volatile memory and may process the loaded command or data. Further, the AP or the MCU may store data received from or generated by at least one of other elements in a non-volatile memory.

The communication module 220 (e.g., the communication interface 160) may transmit and receive data in communication between the electronic device 201 and any other external device (e.g., the external electronic device 102, the other external electronic device 104, or the server 106) connected thereto through a network. According to an embodiment of the present disclosure, the communication module 220 may include a cellular module 221, a Wi-Fi module 223, a BT module 225, a GPS module 227, an NFC module 228, and a radio frequency (RF) module 229.

The cellular module 221 may provide a voice call, a video call, an SMS, or an Internet service through a communication network (e.g., LTE, LTE-A, CDMA, WCDMA, UMTS, WiBro, or GSM). Further, the cellular module 221 may identify and authenticate an electronic device in a communication network using, for example, a subscriber identification module (e.g., the SIM card 224). According to an embodiment of the present disclosure, the cellular module 221 may perform at least some of functions that may be provided by the AP 210. The cellular module 221 may, for example, perform at least some multimedia control functions.

According to an embodiment of the present disclosure, the cellular module 221 may include a communication processor (CP). Further, the cellular module 221 may, for example, be implemented as an SoC. Although FIG. 2 shows the elements such as the cellular module 221 (e.g., CP), the memory 230, and the power management module 295 as being separate from the AP 210, according to an embodiment of the present disclosure, the AP 210 may be implemented to include at least some (e.g., the cellular module 221) of the above elements.

According to an embodiment of the present disclosure, the AP 210 or the cellular module 221 (e.g., CP) may load a command or data received from at least one of a non-volatile memory and any other element connected to each of the AP 210 and the cellular module 221 into a volatile memory and may process the command or data loaded into the volatile memory. Further, the AP 210 or the CP 221 may store data received from or generated by at least one of other elements in a non-volatile memory.

The Wi-Fi module 223, the BT module 225, the GPS module 227, or the NFC module 228 may, for example, include a processor for processing data transmitted and received through the corresponding module. Although FIG. 2 shows each of the cellular module 221, the Wi-Fi module 223, the BT module 225, the GPS module 227, and the NFC module 228 as being a separate block, according to an embodiment of the present disclosure, at least some (e.g., two or more) of the cellular module 221, the Wi-Fi module 223, the BT module 225, the GPS module 227, and the NFC module 228 may be included in one IC or one IC package. For example, at least some of the processors corresponding respectively to the cellular module 221, the Wi-Fi module 223, the BT module 225, the GPS module 227, and the NFC module 228 (e.g., the CP corresponding to the cellular module 221 and the Wi-Fi processor corresponding to the Wi-Fi module 223) may be implemented as one SoC.

The RF module 229 may transmit and receive data, for example, RF signals. Although not shown in the drawing, the RF module 229 may, for example, include a transceiver, a power amp module (PAM), a frequency filter, a low noise amplifier (LNA), or the like. Further, the RF module 229 may further include a component for transmitting and receiving an electromagnetic wave in a free airspace in wireless communication, for example, a conductor or a conducting wire. Although FIG. 2 shows the cellular module 221, the Wi-Fi module 223, the BT module 225, the GPS module 227, and the NFC module 228 as sharing one RF module 229, according to an embodiment of the present disclosure, at least one of the cellular module 221, the Wi-Fi module 223, the BT module 225, the GPS module 227, and the NFC module 228 may transmit and receive an RF signal through a separate RF module.

The SIM card 224 may be a card including a subscriber identification module and may be inserted into a slot formed in a predetermined position of the electronic device. The SIM card 224 may include unique identification information (e.g. an integrated circuit card identifier (ICCID)) or unique subscriber information (e.g., an international mobile subscriber identity (IMSI)).

The memory 230 (e.g., the memory 130) may include an internal memory 232 or an external memory 234. The internal memory 232 may, for example, include at least one of a volatile memory (e.g., a dynamic random access memory (DRAM), a static RAM (SRAM), or a synchronous dynamic RAM (SDRAM)) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, or a not or (NOR) flash memory).

According to an embodiment of the present disclosure, the internal memory 232 may be a solid state drive (SSD). The external memory 234 may further include a flash drive, for example, a compact flash (CF), a secure digital (SD), a micro secure digital (Micro-SD), a mini secure digital (Mini-SD), an extreme digital (xD), a Memory Stick, or the like. The external memory 234 may be functionally connected to the electronic device 201 through various interfaces. According to an embodiment of the present disclosure, the electronic device 201 may further include a storage device (or storage medium) such as a hard drive.

The sensor module 240 may measure a physical quantity or sense an operational state of the electronic device 201 and may convert the measured or sensed information into an electric signal. The sensor module 240 may, for example, include at least one of a gesture sensor 240A, the gyro sensor 240B, an atmospheric pressure sensor 240C, a magnetic sensor 240D, the acceleration sensor 240E, a grip sensor 240F, a proximity sensor 240G, a color sensor 240H (e.g., red/green/blue (RGB) sensor), a biometric sensor 240I, a temperature/humidity sensor 240J, a light sensor 240K, an ultraviolet (UV) sensor 240M, the geomagnetic sensor 240P, and a fingerprint recognition sensor 240Q. Additionally or alternatively, the sensor module 240 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), or the like. The sensor module 240 may further include a control circuit for controlling at least one sensor included therein.

The input module 250 may include a touch panel 252, a (digital) pen sensor 254, a key 256, or an ultrasonic input unit 258. The touch panel 252 that detects a touch input may, for example, include at least one of a capacitive touch panel, a resistive touch panel, an infrared touch panel, and an ultrasonic touch panel. The touch panel 252 may further include a control circuit. The capacitive touch panel may be able to detect physical contact or proximity. The touch panel 252 may further include a tactile layer. In this case, the touch panel 252 may provide a tactile response to a user.

The (digital) pen sensor 254 may, be implemented using a means identical or similar to a means for receiving a touch input from a user or using a separate detection sheet. The key 256 may, for example, include a physical button, an optical key, or a keypad. The ultrasonic input unit 258 may be a unit that may identify data by generating an ultrasonic signal through an input tool and detecting a sonic wave through a microphone (e.g., the microphone 288) in the electronic device 201 and may be capable of wireless detection. According to an embodiment of the present disclosure, the electronic device 201 may receive a user input from an external device (e.g., computer or server) connected thereto using the communication module 220.

The display 260 (e.g., the display 150) may include a panel 262, a hologram unit 264, or a projector 266. The panel 262 may, for example, be a liquid crystal display (LCD), an active matrix-organic light emitting diode (AM-OLED), or the like. The panel 262 may, for example, be implemented to be flexible, transparent, or wearable. The panel 262 and the touch panel 252 may be incorporated into one module. The hologram unit 264 may show a stereoscopic image in the air using light interference. The projector 266 may display an image by projecting light onto a screen. The screen may, for example, be located inside or outside of the electronic device 201. According to an embodiment of the present disclosure, the display 260 may further include a control circuit for controlling the panel 262, the hologram unit 264, or the projector 266.

The interface 270 may, for example, include a high-definition multimedia interface (HDMI) 272, a USB 274, an optical interface 276, or a D-subminiature (D-sub) 278. The interface 270 may, for example, be included in the communication interface 160 shown in FIG. 1. Additionally or alternatively, the interface 270 may, for example, include a mobile high-definition link (MHL) interface, an SD card/multi-media card (MMC) interface, or an infrared data association (IrDA) interface.

The audio module 280 may convert a sound and an electrical signal in a bidirectional manner, that is, may convert a sound into an electrical signal and vice versa. At least some elements of the audio module 280 may, for example, be included in the input/output interface 140 shown in FIG. 1. The audio module 280 may, for example, process sound information input or output through a speaker 282, a receiver 284, earphones 286, or a microphone 288. The camera module 291 may be a device that may take both still and moving images, and according to an embodiment of the present disclosure, may include at least one image sensor (e.g., front sensor or rear sensor; not shown), a lens (not shown), an image signal processor (ISP) (not shown), or a flash (e.g., LED or xenon lamp; not shown).

The power management module 295 may manage power of the electronic device 201. Although not shown in the drawing, the power management module 295 may, for example, include a power management integrated circuit (PMIC), a charger IC, or a battery or fuel gauge. According to various embodiments of the present disclosure, the PMIC may be mounted in an integrated circuit or an SoC semiconductor. The charging methods may be classified into wired charging and wireless charging. The charger IC may charge a battery and may prevent an overvoltage or excess current from being induced or from flowing from a charger.

According to an embodiment of the present disclosure, the charger IC may include a charger IC for at least one of the wired charging and the wireless charging. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may, for example, measure the residual capacity, charge in voltage, current, or temperature of the battery 296. The battery 296 may store or generate electricity and may supply power to the electronic device 201 using the stored or generated electricity. The battery 296 may, for example, include a rechargeable battery or a solar battery.

The indicator 297 may display a specific state of the electronic device 201 or a part thereof (e.g., the AP 210), for example, a boot-up state, a message state, or a state of charge (SOC). The motor 298 may convert an electrical signal into a mechanical vibration. Although not shown in the drawing, the electronic device 201 may include a processing unit (e.g., GPU) for supporting mobile TV. The processing unit for supporting mobile TV may, for example, process media data pursuant to a certain standard such as digital multimedia broadcasting (DMB), digital video broadcasting (DVB), or media flow.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

To perform a security authentication procedure based on fingerprint information, the electronic device 101 (e.g. electronic device 201) may compare a fingerprint (e.g., fingerprint signal corresponding to fingerprint, image of fingerprint, or feature information corresponding to fingerprint) input through the fingerprint recognition sensor 170 with at least one image corresponding to a fingerprint (hereinafter referred to as "fingerprint image" (e.g., fingerprint signal corresponding to fingerprint, image of fingerprint, or feature information corresponding to fingerprint)), stored in at least one of the memory 130 of the electronic device 101, the memory (not shown) of the external electronic device 102, the memory (not shown) of the other external electronic device 104, and the memory (not shown) of the server 106 and as a result of the comparison, may determine the fingerprint that matches the input fingerprint or the specified feature region of the fingerprint. In comparing a fingerprint input through the fingerprint recognition sensor 170 with fingerprint images stored in the memory, the electronic device 101 may perform the comparison according to comparison reference value information determined based on situation information of the electronic device 101. The comparison reference value information may be information on the priorities of fingerprint images that are stored in the memory based on the situation information of the electronic device 101 or the priorities of categories to which the fingerprint images stored in the memory belong, and the comparison reference value information may be hereinafter referred to as "comparison group information". Although information on the priorities of fingerprint images or categories to which fingerprint images belong has been described as the comparison group information, it will be apparent that the comparison group information is not limited thereto and may be information on fingerprint images or categories to which fingerprint images belong. The electronic device 101 may acquire a fingerprint image in various ways.

According to an embodiment of the present disclosure, the fingerprint recognition sensor 170 of the electronic device 101 may be disposed in a predetermined location of the electronic device 101 (e.g., may be included as a part of a button). The fingerprint recognition sensor 170 may acquire a fingerprint corresponding to the fingerprint side of a finger with which a user touches the fingerprint recognition sensor 170, may optically acquire the fingerprint image of a user's finger that comes in contact with or comes in proximity to the fingerprint recognition sensor 170, or may acquire a fingerprint by a user's action of swiping his/her finger in a certain direction over the fingerprint recognition sensor 170. In the case of the swipe type in which a fingerprint is acquired by a user's action of swiping his/her finger in a certain direction over the fingerprint recognition sensor 170, there may be a fingerprint image acquired when a user swipes his/her finger in a first direction over the fingerprint recognition sensor 170 and a fingerprint image acquired when a user swipes his/her finger in a second direction over the fingerprint recognition sensor 170, and the acquired fingerprint images may be classified into different categories. According to various embodiments of the present disclosure, the fingerprint recognition sensor 170 of the electronic device 101 may be implemented as an in-cell type in the display 150. The electronic device 101 may acquire a fingerprint when the fingerprint side of a finger comes in contact with or comes in proximity to the fingerprint recognition sensor 170 that is activated in a predetermined region of the display 150 or may acquire a fingerprint in the process of dragging (or pulling) a finger the fingerprint side of which comes in contact with the fingerprint recognition sensor 170. The electronic device 101 may classify the image of the fingerprint acquired when the fingerprint side comes in contact with the display 150 and the image of the fingerprint acquired during the dragging of the fingerprint side that comes in contact with the display 150 into different categories. The electronic device 101 may determine whether the fingerprint image acquired through the fingerprint recognition sensor 170 is a fingerprint corresponding to a finger of the left hand, a fingerprint corresponding to the right hand, a fingerprint corresponding to an adult's hand, or a fingerprint corresponding to a child's hand based on the situation information acquired through the situation detection sensor 180 and may include the fingerprint image in any one of the classified categories according to the determined type of fingerprint. The electronic device 101 may employ at least one type of fingerprint recognition sensor among various types of fingerprint recognition sensors as described above and may assign the fingerprint image acquired through the fingerprint recognition sensor 170 to at least one specified category based on such information as a fingerprint image acquisition method that has been set in the electronic device 101, user selections, and the size of the fingerprint.

The electronic device 101 may perform a security authentication procedure (e.g., procedure for disabling the security set to enabled) based on the acquired fingerprint (or fingerprint information). The security authentication procedure performed by the electronic device 101 may determine whether a fingerprint (or the specified feature region of a fingerprint) input through the fingerprint recognition sensor 170 matches the fingerprint corresponding to at least one specified profile (e.g., specific user profile or user group profile) that has been set in the electronic device 101. The specified profile may include a user profile which includes at least one of the ID, sex, contact (e.g., phone number), photo, age, and at least one fingerprint of a specific user and functions of the electronic device 101 that are allowed to be used by the specific user. Further, the specified profile may include a user group profile which includes at least one of such information as the friend relationship and the family relationship on Social Networking Service (SNS) based on at least one user profile. When a fingerprint for use in a security authentication procedure is set for one profile, the electronic device 101 may determine, as the security authentication code of the corresponding profile, the fingerprint input through the fingerprint recognition sensor 170 at the setting time or a plurality of fingerprints that are selected from fingerprint images stored in at least one of the memory 130, the memory (not shown) of the external electronic device 102, the memory (not shown) of the external other electronic device 104, and the memory (not shown) of the server 106. The electronic device 101 may set at least two fingerprints as the security authentication code for one user profile. The security authentication code may be a code for setting the security to enabled or disabling the security set to enabled. To perform the security authentication procedure, the electronic device 101 may compare the input fingerprint with at least one fingerprint image based on comparison group information stored in the memory of the electronic device 101. In determining the priorities of comparison group information stored in the memory, the electronic device 101 may prioritize the comparison group information based on the situation information determined at the time the fingerprint is input into the electronic device 101.

According to another embodiment of the present disclosure, the electronic device 101 may perform a predetermined function corresponding to a specific fingerprint of a specific user based on the acquired fingerprint (or fingerprint information). For example, each recognition of each fingerprint may run different applications, may perform an ID and password input function for different sites in place of a user, or may perform a finger-specific function such as the volume up/down function or the TV channel up/down function.

Hereinafter, an operation of determining situation information of the electronic device, an operation of determining comparison group information based on the situation information, and/or an operation of controlling the electronic device 101 according to various embodiments of the present disclosure will be described with reference to the accompanying drawings.

Figure 3:
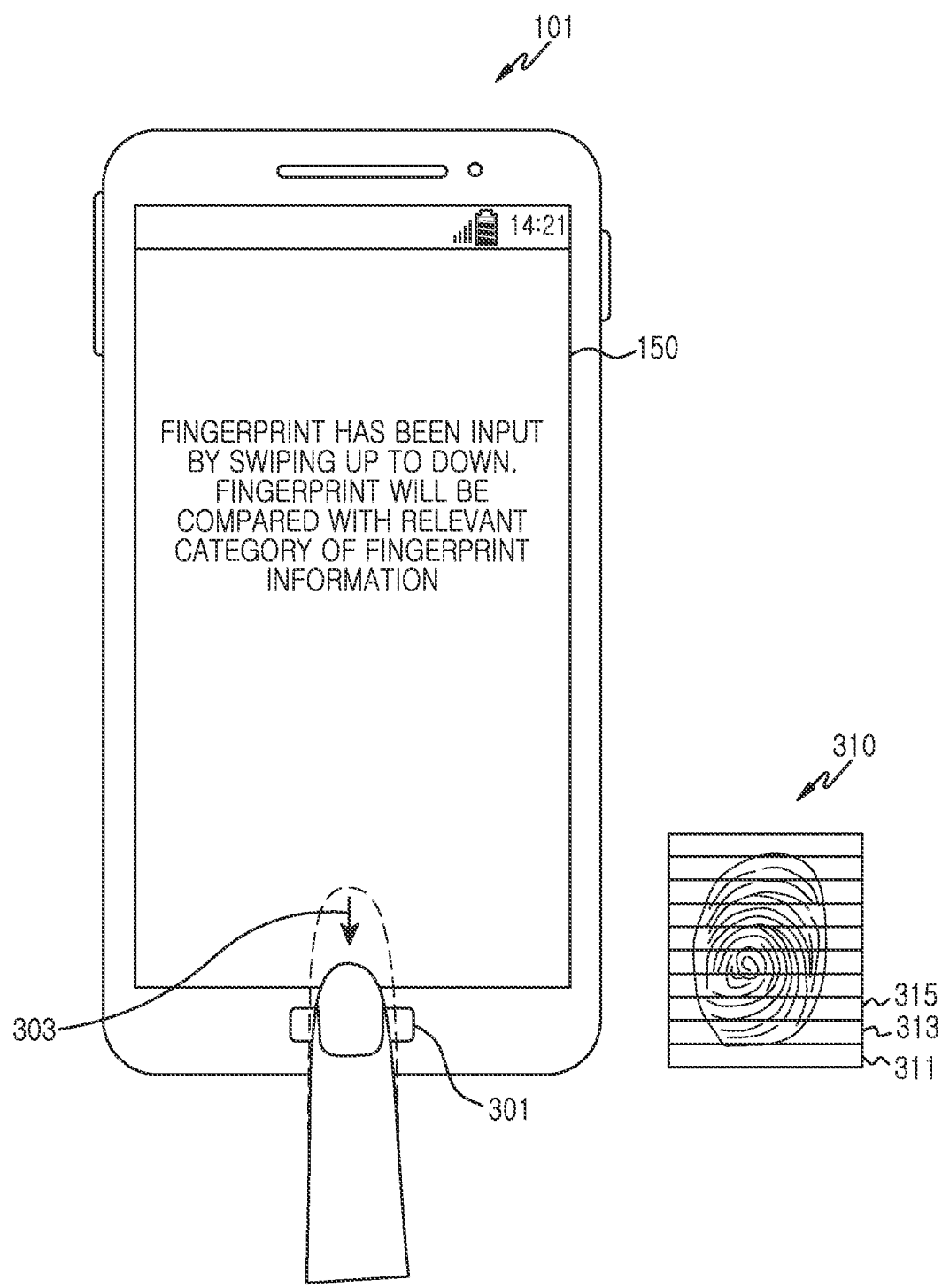
FIG. 3 illustrates processing a detected fingerprint based on situation information in an electronic device according to various embodiments of the present disclosure.

FIG. 3 illustrates processing a detected fingerprint based on situation information in an electronic device according to various embodiments of the present disclosure.

Referring to FIG. 3, the electronic device 101 may acquire situation information of the electronic device 101 at a time when a fingerprint image corresponding to at least one finger is acquired through a fingerprint recognition sensor 301. Based on the acquired situation information, the electronic device 101 may determine comparison group information to be compared with the fingerprint image acquired through the fingerprint recognition sensor 301. According to an embodiment of the present disclosure, the electronic device 101 may determine that the electronic device 101 is operated in a vertical mode (e.g., state where the longer side of the electronic device 101 is oriented vertically) at the time the fingerprint is recognized through the fingerprint recognition sensor 301. The situation information of the electronic device 101 may be determined based on information on the location, pose (e.g., posture or position), or movement of the electronic device 101 that is acquired through at least one sensor included in the electronic device 101. The sensor included in the electronic device 101 may include at least one sensor in the sensor module 240 shown in FIG. 2 and may include one sensor module or at least two sensor modules each including at least one sensor. When the electronic device 101 acquires a fingerprint image through the fingerprint recognition sensor 301 while being operated in the vertical mode, the electronic device 101 may search for a fingerprint that matches the fingerprint included in the fingerprint image according to comparison group information assigned to the vertical mode. According to an embodiment of the present disclosure, the electronic device 101 may set, as the security authentication code, a fingerprint that is acquired by a user's action of swiping his/her finger in the up-to-down direction 303 (e.g., from the standpoint of the fingerprint recognition sensor 301, action of scanning the fingerprint side of the finger from down to up (e.g., when the "up" direction of the fingerprint side of the finger is defined as toward the fingertip and the "down" direction of the fingerprint side of the finger is defined as toward the palm)) over the swipe type fingerprint recognition sensor 301 disposed below the display 150 when the electronic device 101 is in the vertical mode (or portrait mode). The fingerprint acquired by a user's action of swiping his/her finger in the up-to-down direction 303 over the swipe type fingerprint recognition sensor 301 may, for example, be a fingerprint that is acquired by repeatedly (e.g., at least once) inputting the same fingerprint of the fingerprint side of the finger through the fingerprint recognition sensor 301 to acquire all or portions of the fingerprint and combining, merging, or modifying the acquired fingerprint or fingerprint portions into a finished fingerprint image 310 (e.g., may be generated by stacking a first fingerprint portion 311, a second fingerprint portion 313, and a third fingerprint portion 315 in order of acquisition).

Upon detecting the vertical mode and/or a user's action of swiping his/her finger in the up-to-down direction 303 over the swipe type fingerprint recognition sensor 310, the electronic device 101 may determine, as a higher priority (e.g., the first priority) of comparison group information, a category corresponding to reference fingerprint images that have been acquired by a user's action of swiping his/her finger in the up-to-down direction 303 over the swipe type fingerprint recognition sensor 301 and have been pre-registered. Further, when a fingerprint is input through the swipe type fingerprint recognition sensor 301 in the vertical mode of the electronic device 101, the electronic device may determine, as a higher priority (e.g., the first priority) of comparison group information, a category corresponding to fingerprint images acquired by a user's action of swiping his/her finger in the up-to-down direction 303 over the swipe type fingerprint recognition sensor 301 based on information indicating that the electronic device 101 has a history in which a fingerprint has been input by a user's action of swiping his/her finger in the up-to-down direction 303 over the swipe type fingerprint recognition sensor 301 or a history in which a fingerprint input by a user's action of swiping his/her finger in the up-to-down direction 303 over the swipe type fingerprint recognition sensor 301 has been set as the security authentication code. The electronic device 101 may compare the fingerprint acquired through the fingerprint recognition sensor 301 with fingerprint images belonging to the first priority category. When the fingerprint image that matches the acquired fingerprint cannot be determined from fingerprint images belonging to the first priority category, the electronic device 101 may compare the acquired fingerprint with fingerprint images belonging to the category determined as the next-to-first priority of comparison group information or the fingerprint image determined as the next-to-first priority of comparison group information. Although an example of acquiring a fingerprint by a user's action of swiping his/her finger in the up-to-down direction 303 over the swipe type fingerprint recognition sensor 301 has been described above, the present disclosure is not limited thereto, and the electronic device 101 may acquire a fingerprint by a user's action of swiping his/her finger in the down-to-up direction (e.g., when the "up" direction of the fingerprint side of the finger is defined as toward the fingertip and the "down" direction of the fingerprint side of the finger is defined as toward the palm)) over the swipe type fingerprint recognition sensor 301. The electronic device 101 may determine comparison group information at a time when a fingerprint is detected (e.g., at a time when a fingerprint is acquired through the fingerprint recognition sensor 301) and may determine, as a higher priority (e.g., the first priority) of comparison group information, a category corresponding to fingerprint images acquired by a user's action of swiping his/her finger in the up-to-down direction 303 over the swipe type fingerprint recognition sensor 301 when the electronic device 101 is in the vertical mode. The electronic device 101 may compare a fingerprint acquired through the fingerprint recognition sensor 301 with a comparison group of fingerprint images according to the priorities of comparison group information. When the category corresponding to fingerprint images acquired by a user's action of swiping his/her finger up to down over the fingerprint recognition sensor 301 is determined as the first priority of comparison group information to be compared with the fingerprint acquired in the vertical mode of the electronic device 101, the electronic device may output a corresponding message (e.g., "fingerprint has been input by swiping up to down. Fingerprint will be first compared with relevant category of fingerprint information."). According to the above embodiment of the present disclosure in FIG. 3, when the "up" direction of the fingerprint side of a finger is defined as toward the fingertip and the "down" direction of the fingerprint side of a finger is defined as toward the palm, a user's action of swiping his/her finger in the up-to-down or down-to-up direction over the fingerprint recognition sensor 301 has been described as a way for the electronic device 101 to acquire a fingerprint. However, the present disclosure is not limited thereto, and it will be apparent that a fingerprint may be acquired by a user's action of swiping his/her finger over the fingerprint recognition sensor 301 in the left-and-right direction, rather than in the up-and-down direction.

The electronic device 101 may detect the direction in which a user swipes his/her finger over the fingerprint recognition sensor 301 in various ways. As an example, the display 150 with a built-in touch sensor or proximity sensor may be used with the fingerprint recognition sensor 301. That is, when a user swipes his/her finger up to down, a touch signal may be first generated on the display 150, and subsequently a fingerprint may be acquired by the fingerprint recognition sensor. Contrarily, when a user swipes his/her finger down to up, a fingerprint may be first input through the fingerprint recognition sensor, and subsequently a touch signal may be generated on the display. According to an embodiment of the present disclosure, the direction in which a user swipes his/her finger may also be determined by the order in which a touch signal and a fingerprint input signal are terminated. That is, when a user swipes his/her finger up to down, the touch signal on the display 150 is first terminated, and subsequently the input signal through the fingerprint recognition sensor 301 is terminated. In addition to the above example, a touch sensor may be mounted in the bezel portion adjacent to the fingerprint recognition sensor so as to determine the direction in which a user swipes or touches the fingerprint recognition sensor, and the direction toward the fingertip or the palm may be determined by optically detecting the shape of the finger.

According to an embodiment of the present disclosure, the order in which fingerprint portions acquired through the swipe type fingerprint recognition sensor are combined into a fingerprint image may vary according to the direction in which a user swipes his/her finger. For example, when a user swipes his/her finger up to down, the fingerprint of the finer may be input in order of a first fingerprint portion 311, a second fingerprint portion 313, a third fingerprint portion 315, and the like. In contrast, when a user swipes his/her finger down to up, fingerprint portions may be acquired in order of a third fingerprint portion 315, a second fingerprint portion 313, a first fingerprint portion 311, and the like, and a fingerprint image with the fingerprint portions stacked in that order may be generated. That is, when a user swipes his/her finger down to up, the stacking order of image blocks corresponding to the respective fingerprint portions is changed, and thus an upside-down fingerprint may be input. According to an embodiment of the present disclosure, when one image block includes several scan lines, an abnormal fingerprint may be input depending on the order in which image blocks are stacked.

Figure 4:
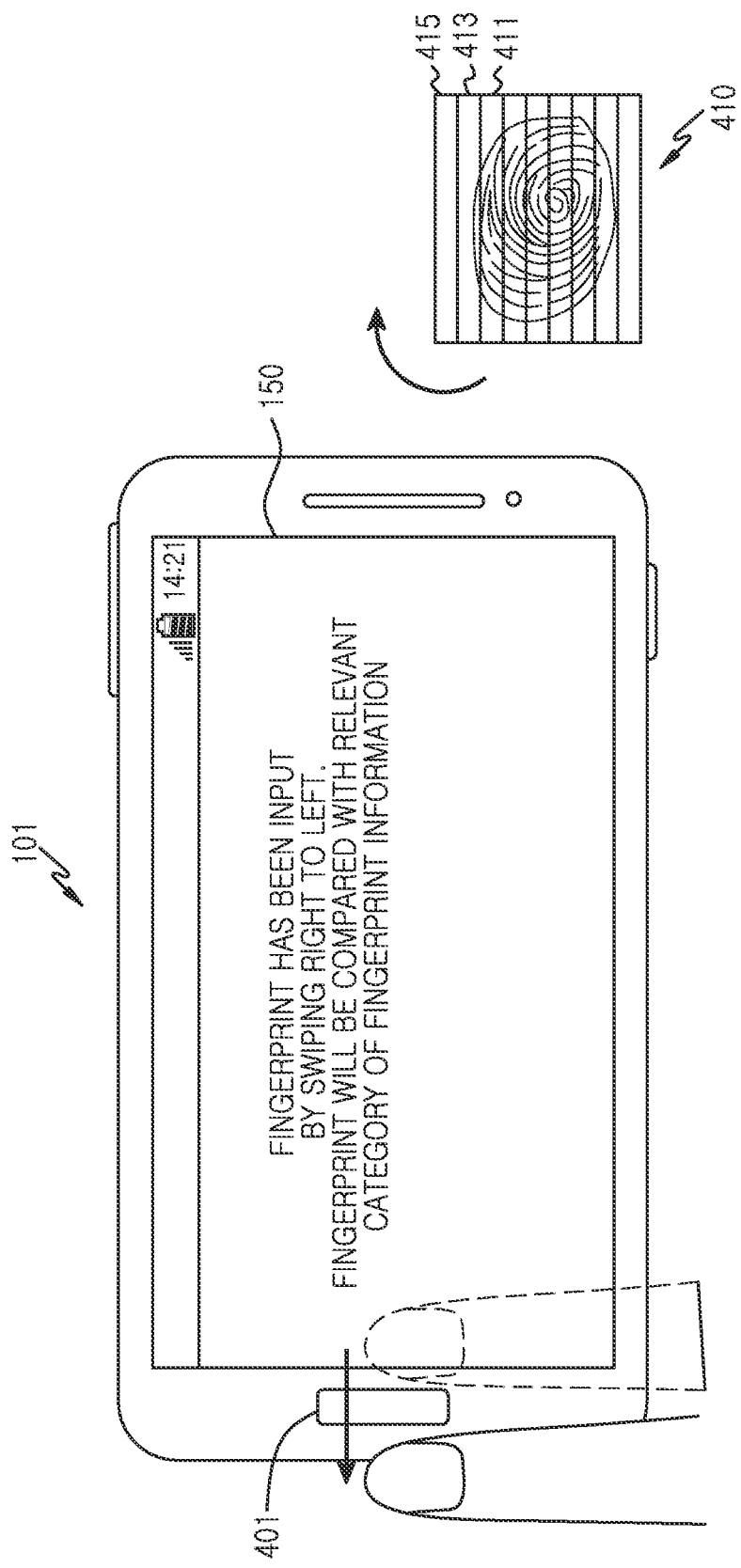
FIG. 4 illustrates processing a detected fingerprint based on situation information in an electronic device according to various embodiments of the present disclosure.

FIG. 4 illustrates processing a detected fingerprint based on situation information in an electronic device according to various embodiments of the present disclosure.

Referring to FIG. 4, the electronic device 101 may determine, based on situation information, that the electronic device 101 is operated in a horizontal mode (or landscape mode (e.g., state where the longer side of the electronic device 101 is oriented horizontally)). The electronic device 101 may determine, through at least one sensor, that the electronic device 101 is in the horizontal mode and may acquire a fingerprint that is input through the fingerprint recognition sensor in the horizontal mode. To determine the fingerprint image that matches the acquired fingerprint, the electronic device 101 may determine comparison group information to be used for fingerprint authentication in the horizontal mode. According to an embodiment of the present disclosure, in determining the comparison group information, the electronic device 101 may determine, as a higher priority (e.g., the first priority) of comparison group information, a category corresponding to situation information (e.g., at least one of the rotational state of the electronic device and the direction of fingerprint authentication) for a fingerprint specified at the time the reference fingerprint authentication code has been input for security authentication setting of the electronic device 101. When the electronic device 101 is in the horizontal mode, the electronic device 101 may, for example, recognize a fingerprint by a user's action of swiping his/her finger right to left over the fingerprint recognition sensor 401, thereby acquiring a fingerprint image 410. In determining comparison group information for a comparison with the acquired fingerprint, the electronic device 101 may determine, as a higher priority of comparison group information, a category corresponding to reference fingerprint images input in the horizontal mode of the electronic device 101 or reference fingerprint images input right to left at the time a reference fingerprint has been registered.

In view of the rotation angle of information displayed on the display, the horizontal mode covers the case where the displayed information is rotated 90 degrees in the clockwise direction from the orientation in FIG. 3 and the case where the displayed information is rotated 270 degrees in the clockwise direction from the orientation in FIG. 3, and thus a higher priority of comparison group information may be determined using such rotation information for a terminal or information displayed on a terminal.

According to another embodiment of the present disclosure, in comparing a fingerprint image 410 input through the fingerprint recognition sensor 401 of the electronic device 101 with a comparison group of fingerprint images according to comparison group information, the electronic device 101 may compare the input fingerprint with a fingerprint image (e.g., see the fingerprint image 310 in FIG. 3) in which the fingerprint is displayed differently from the input fingerprint (e.g., in a different arrangement, at a different angle, or with a different size). For example, to compare the fingerprints of the fingerprint image 310 and the fingerprint image 410 or the feature regions specified for the fingerprints of the fingerprint image 310 and the fingerprint image 410, the electronic device 101 may rotate the fingerprint image 410 based on the fingerprint image 310. For example, when a fingerprint is input right to left, the fingerprint may be input in order of a first fingerprint portion 411, a second fingerprint portion 413, and a third fingerprint portion 415, and the fingerprint image 410 may be acquired by stacking the fingerprint portions in that order. Accordingly, in order to compare the input fingerprint with a reference fingerprint in which the fingertip is oriented upward as in the fingerprint image 310, the electronic device 101 may rotate the fingerprint image 410, 90 degrees in the clockwise direction, thereby making the comparison easier.

However, the present disclosure is not limited thereto, and it will be apparent that the electronic device 101 may also rotate the fingerprint image 310 corresponding to comparison group information based on the input fingerprint image 410. The electronic device 101 may modify an acquired fingerprint image based on the shape of the fingerprint included in a comparison group fingerprint image and compare the modified fingerprint image with the comparison group fingerprint image or may modify a comparison group fingerprint image based on the shape of the fingerprint included in an acquired fingerprint image and compare the modified comparison fingerprint image with the acquired fingerprint image. When the category corresponding to fingerprint images acquired by a user's action of swiping his/her finger right to left over the fingerprint recognition sensor 301 is determined as the first priority of comparison group information to be compared with the fingerprint acquired in the horizontal mode of the electronic device 101, the electronic device may output a corresponding message (e.g., "fingerprint has been input by swiping right to left. Fingerprint will be first compared with relevant category of fingerprint information.").

Figure 5:
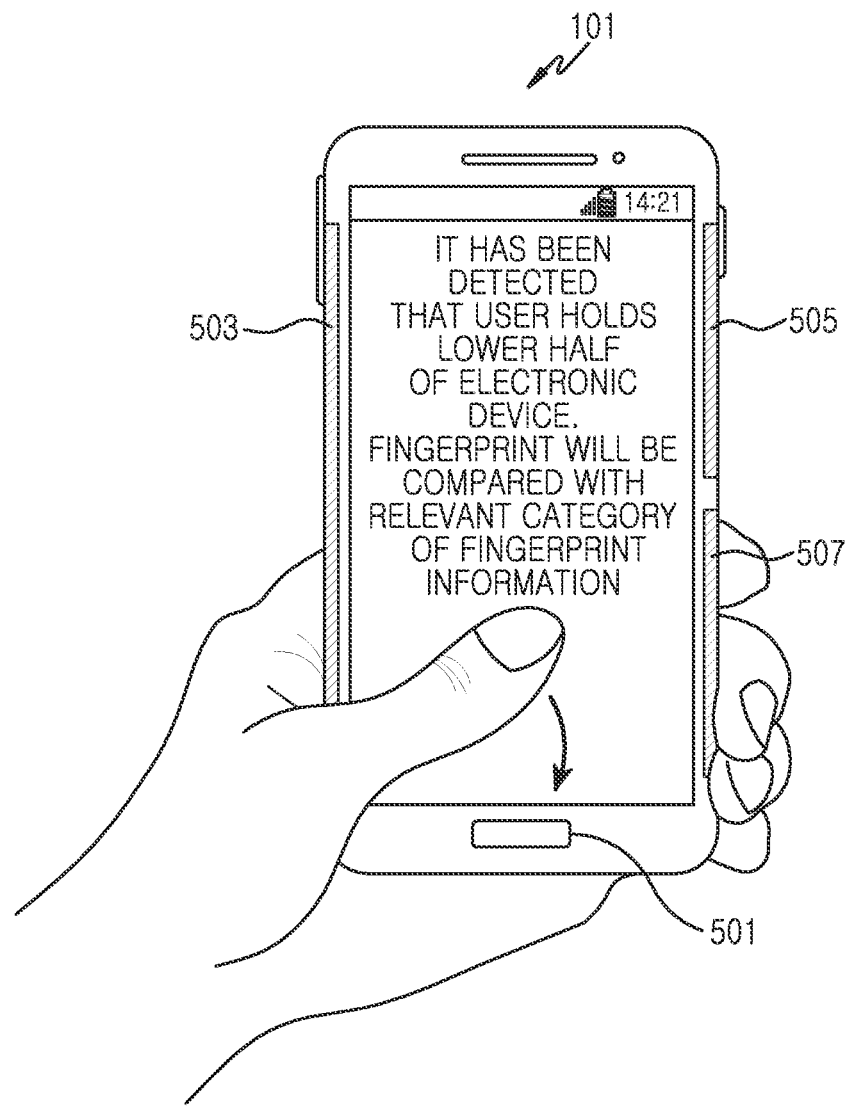
FIG. 5 illustrates processing a detected fingerprint based on information on a situation in which an electronic device comes in contact with a user's body in the electronic device according to various embodiments of the present disclosure.

FIG. 5 illustrates processing a detected fingerprint based on information on the situation in which an electronic device comes in contact with a user's body in the electronic device according to various embodiments of the present disclosure.

Referring to FIG. 5, the electronic device 101 may include at least one sensor that may determine the situation in which the electronic device 101 comes in contact with a user's body (e.g., grip pattern in which a user holds the electronic device 101 or wearing pattern in which a user wears the electronic device 101). According to an embodiment of the present disclosure, as a module for determining the grip pattern or wearing pattern of the electronic device 101, the electronic device 101 may include at least one of the grip sensor 240F, the proximity sensor 240G, the biometric sensor 240I, the light sensor 240K, and a touch sensor (or touch panel) or at least two linked sensors selected from them. When the electronic device 101 includes sensors for determining the grip pattern or wearing pattern of the electronic device 101, each sensor may be included as a separate sensor module or at least two sensors may be included in one sensor module. The electronic device 101 may acquire information on the grip pattern or wearing pattern of the electronic device 101 by including at least one sensor module.

According to an embodiment of the present disclosure, the electronic device 101 may include at least one sensor (e.g., the grip sensor 240F or touch sensor) for detecting the grip pattern of the electronic device 101 in a predetermined location (e.g., may be the left or right edge region or the rear surface of the electronic device 101). The electronic device 101 may determine the situation in which a user holds the electronic device 101 based on the grip pattern detected by the sensor. For example, when a user holds the electronic device 101 with his/her left hand as shown in FIG. 5, the electronic device 101 may identify the positions of the contact points of the user's fingers or hand on the electronic device 101 through a grip sensor 503, a grip sensor 505, and/or a grip sensor 507 and, based thereon, may determine that the user holds the electronic device with his/her left hand. In addition, the electronic device 101 may determine whether a user holds the electronic device 101 in a specified location (e.g., the upper half or lower half of the electronic device 101). The electronic device 101 may include a fingerprint recognition sensor 501 in the lower edge region below the front display 150 and may determine that the user holds the lower half of the electronic device 101 with his/her left hand. The electronic device 101 may detect a fingerprint recognized through the fingerprint recognition sensor 501 and may determine a fingerprint that matches the detected fingerprint according to comparison group information. For example, when a user holds the lower half of the electronic device 101 with his/her left hand, the electronic device 101 may determine that it is easy for the user to perform a fingerprint input action with his/her left hand thumb or his/her right hand fingers, but it is difficult or impossible for the user to perform a fingerprint input action with his/her left hand fingers except the left hand thumb.

Accordingly, when it is determined that a user holds the lower half of the electronic device 101 with his/her left hand, the electronic device 101 may compare a fingerprint detected through the fingerprint recognition sensor 501 with fingerprint images belonging to a category corresponding to the fingerprint image of the left hand thumb, which has been input through the fingerprint recognition sensor 501 and stored in at least one of the memory 130, the memory (not shown) of the external electronic device 102, and the memory (not shown) of the other external electronic device 104, and the memory (not shown) of the server 106, according to comparison group information of the electronic device 101. According to an embodiment of the present disclosure, the electronic device 101 may notify a user of information on the category to be compared with the detected fingerprint according to comparison group information (e.g., may display the category information on the display 150). When, as a result of comparing the detected fingerprint with fingerprint images belonging to the category corresponding to the fingerprint image of the left hand thumb that has been input through the fingerprint recognition sensor 501, the electronic device fails to determine a fingerprint that matches the detected fingerprint, the electronic device 101 may compare the detected fingerprint with fingerprint images (e.g., fingerprint images of the right hand fingers) belonging to the next priority category according to comparison group information. When the comparison group is changed to another comparison group (e.g., category different from the category to which the fingerprint image having been compared with the detected fingerprint belongs or fingerprint images belonging to a different category) to be compared with the detected fingerprint, the electronic device 101 may notify a user of information on the changed category or fingerprint images (e.g., may display the change information on the display 150).

According to an embodiment of the present disclosure, the electronic device 101 may detect the orientation of a fingerprint input through the fingerprint recognition sensor based on the direction in which the user swipes his/her finger over the fingerprint recognition sensor and may accordingly compare the input fingerprint with reference fingerprint images belonging to a category corresponding to the fingerprint image that has been input in a similar situation to the current situation. For example, when a user swipes his/her left hand thumb over the fingerprint recognition sensor 501 while holding the electronic device 101 with his/her left hand as in FIG. 5, the left hand thumb describes a curved path, and the contact between the thumb and the fingerprint recognition sensor 501 is made from the right side of the thumb. Accordingly, when the electronic device 101 determines that the user holds the lower half of the electronic device 101 with his/her left hand, the electronic device 101 may place the top priority on a comparison group including reference fingerprint images that have been input under such conditions and may preferentially compare the input fingerprint with the reference fingerprint images.

Figure 6:
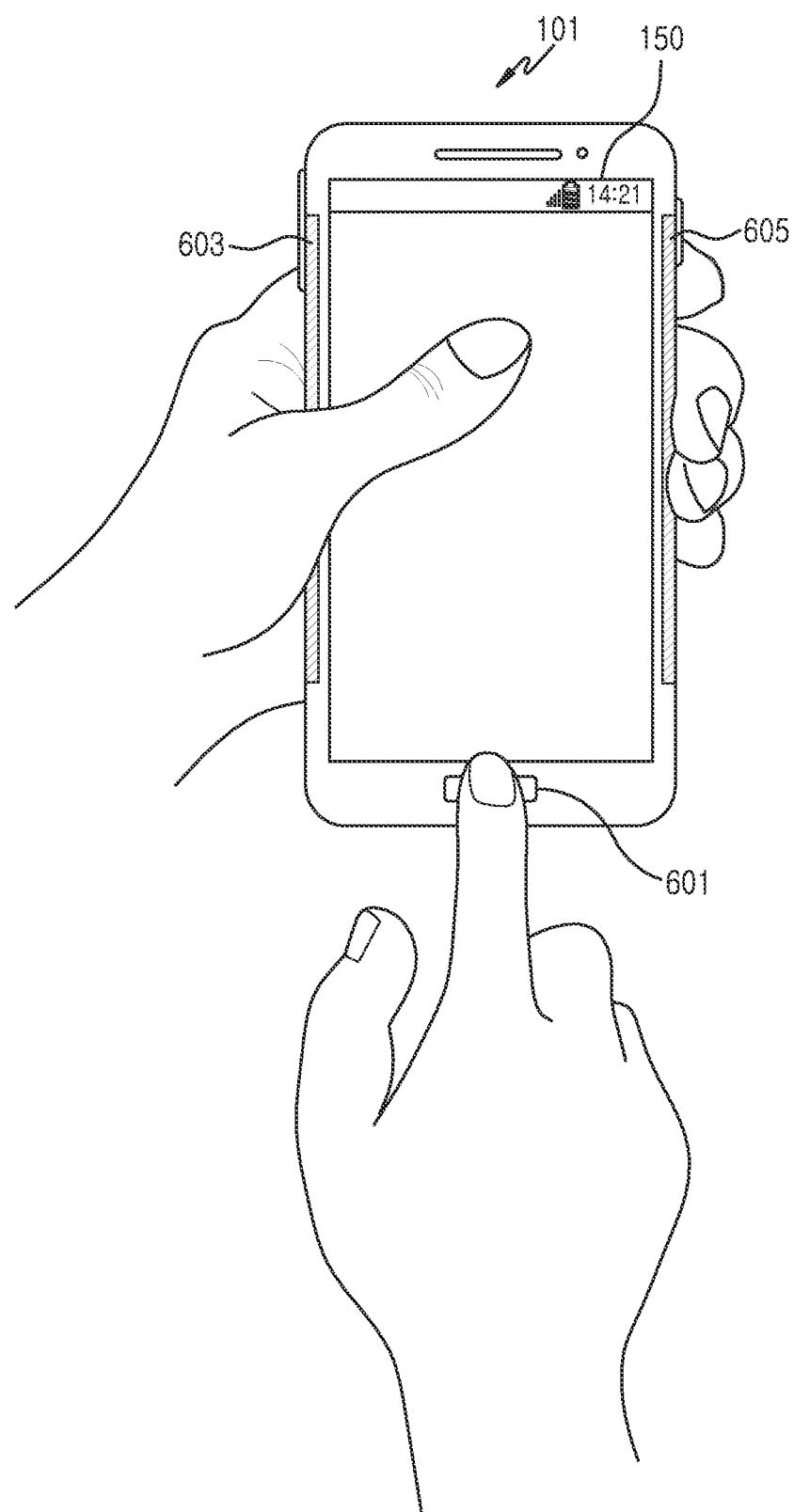
FIG. 6 illustrates processing a detected fingerprint based on information on a situation in which an electronic device comes in contact with a user's body in the electronic device according to various embodiments of the present disclosure.

FIG. 6 illustrates processing a detected fingerprint based on information on a situation in which an electronic device comes in contact with a user's body in the electronic device according to various embodiments of the present disclosure.

Referring to FIG. 6, the electronic device 101 may identify the positions of the contact points of a user's fingers or hand on the electronic device 101 through at least one sensor included in a predetermined location of the electronic device 101 (e.g., grip sensor or touch sensor disposed in the edge region or on the rear surface of the electronic device 101) and, based thereon, may determine that the user holds the upper half (e.g., when the electronic device 101 is divided into the upper half and the lower half in the vertical direction) of the electronic device with his/her left hand. According to an embodiment of the present disclosure, when the electronic device 101 detects a fingerprint through a fingerprint recognition sensor 601 while the user holds the upper half of the electronic device 101 with his/her left hand, the electronic device 101 may determine that the user has input the fingerprint of any of his/her right hand fingers.

According to another embodiment of the present disclosure, when a user holds the electronic device 101 with his/her left hand, the electronic device 101 may determine that it is difficult for the user to touch the fingerprint recognition sensor 601 with his/her left hand thumb based on the corresponding positions of the contact points of the user's fingers or hand on the electronic device 101 and may determine that the user inputs the fingerprint of any of his/her right hand fingers when detecting the fingerprint through the fingerprint recognition sensor 601.

Alternatively, the left hand thumb may not come in contact with or come in proximity to the display and may come in contact with a left bezel portion or a grip sensor 603 of the electronic device 101, while a user's fingers may come into contact with a right bezel portion or a grip sensor 605 of the electronic device 101.

In determining comparison group information for a comparison with the detected fingerprint, the electronic device 101 may determine fingerprint images corresponding to the fingerprints of the right hand fingers as the comparison group information or as a higher priority (e.g., the priority) of comparison group information. The electronic device 101 may compare the detected fingerprint with at least one fingerprint image according to the determined comparison group information.

Figure 7:
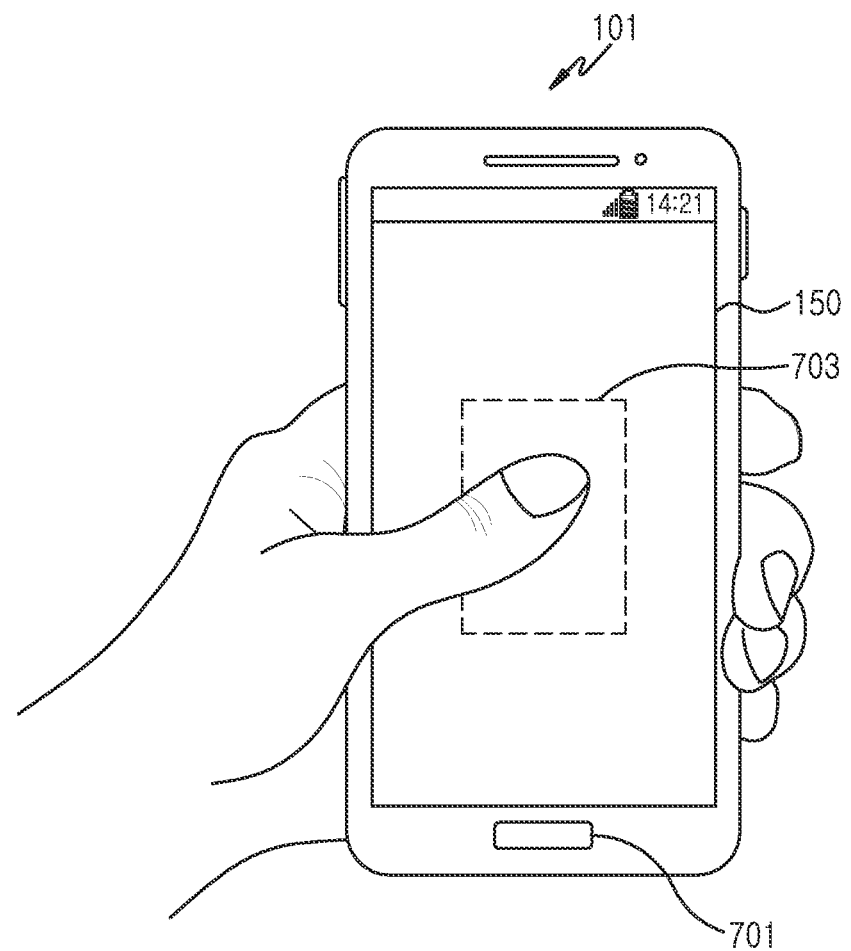
FIG. 7 illustrates processing a detected fingerprint based on information on a situation in which an electronic device comes in contact with a user's body in the electronic device according to various embodiments of the present disclosure.

FIG. 7 illustrates processing a detected fingerprint based on information on a situation in which an electronic device comes in contact with a user's body in the electronic device according to various embodiments of the present disclosure.

Referring to FIG. 7, the electronic device 101 may activate a fingerprint recognition sensor included in a predetermined region 703 of the display 150 and may acquire the fingerprint of a finger touching the corresponding display region 703 through the activated fingerprint recognition sensor. According to an embodiment of the present disclosure, the electronic device 101 may detect a user's hand (e.g., left or right hand) with which a user holds the electronic device 101 through at least one of sensors disposed the edge region or on the rear surface of the electronic device 101. According to an embodiment of the present disclosure, the electronic device 101 may determine whether a user holds the electronic device with his/her left hand or right hand, may determine the grip pattern of the electronic device 101, may detect the user's finger (e.g., thumb) touching a predetermined location of the display 150 (e.g., the display region 703 where the fingerprint recognition sensor of the electronic device 101 is activated), and may detect the fingerprint of the fingerprint side of the touching finger based on at least one of the positions where the user's hand or fingers come in contact with the electronic device 101, the pattern of the contact area, and the relative arrangement of the contact positions by using at least one sensor included in a predetermined location of the electronic device 101.

According to an embodiment of the present disclosure, in determining comparison group information, the electronic device 101 may determine fingerprint images corresponding to the left hand thumb or right hand fingers as the comparison group information when it is determined that the user holds the electronic device 101 with his/her left hand, it is determined that the grip pattern of the fingers corresponds to a pattern in which the rear surface of the electronic device 101 is held in the palm of the left hand, and the fingerprint recognition sensor is activated in the display region. Accordingly, the electronic device 101 may compare the fingerprint input through the fingerprint recognition sensor 703 with a reference fingerprint image, which has been input using the left hand thumb, according to the comparison group information.

According to another embodiment of the present disclosure, the electronic device 101 may determine reference fingerprint images corresponding to the left hand fingers as the comparison group information when one contact point in the right bezel region and at least two contact points in the left bezel region are detected, the palm that comes in contact with or comes in proximity to the display is detected, and in this state, a fingerprint is input through the display region 703 where the fingerprint recognition sensor is activated. That is, this is the case where a user grasps the left and right edges of the bezel of a smart phone lying on a flat surface by his/her left hand, holds the smart phone in his/her left hand, and then inputs the fingerprint of the index finger or middle finger of the left hand.

Figure 8:
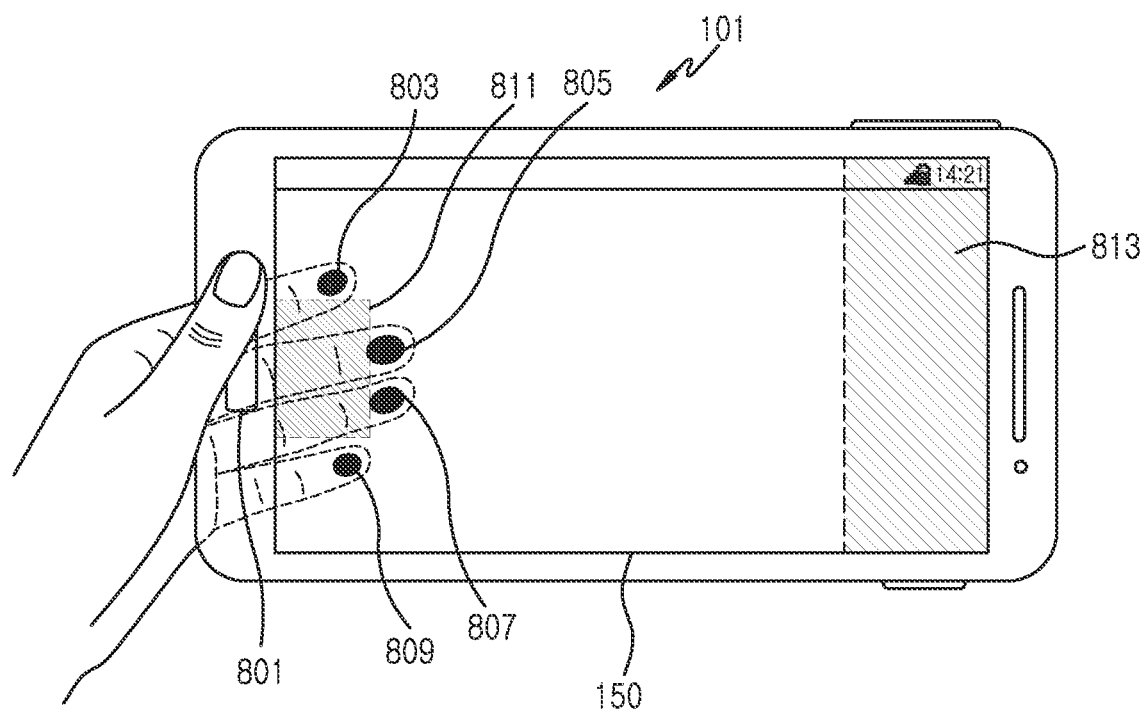
FIG. 8 illustrates processing a detected fingerprint based on information on a situation in which an electronic device comes in contact with a user's body in the electronic device according to various embodiments of the present disclosure.

FIG. 8 illustrates processing a detected fingerprint based on information on a situation in which an electronic device comes in contact with a user's body in the electronic device according to various embodiments of the present disclosure.

Referring to FIG. 8, the electronic device 101 may determine information on a grip pattern of the electronic device 101 through at least one sensor disposed in an edge region or on a rear surface of the electronic device 101. The electronic device 101 may determine a fingerprint recognition sensor to be activated in the electronic device 101 based on the information on the grip pattern. According to an embodiment of the present disclosure, the electronic device may determine the grip pattern of the electronic device 101 based on the situation in which a user's body (e.g., a specified portion of the left hand finger) comes in contact with at least one sensor (e.g., grip sensor or touch sensor) disposed on the rear surface of the electronic device 101. For example, when the situation is such that a portion of a user's left hand finger (e.g., a contact region 803, a contact region 805, a contact region 807, and/or a contact region 809) comes in contact with the sensor for detecting the grip pattern of the electronic device 101, the electronic device 101 may determine that the user holds the electronic device 101 with his/her left hand.

According to an embodiment of the present disclosure, the electronic device 101 may determine, based on the grip pattern, a fingerprint recognition sensor that is expected (e.g., determined based on pre-stored information) to be used by the user to input his/her fingerprint. For example, based on information acquired on the grip pattern (e.g., the contact region 803, the contact region 805, the contact region 807, and/or the contact region 809 acquired through the sensor), the electronic device 101 may determine a fingerprint recognition sensor corresponding to a specified region (e.g., a fingerprint recognition region 811 and/or a fingerprint recognition region 813) that is expected to be touched by the user's finger in the display 150 and/or a fingerprint recognition sensor 801. According to an embodiment of the present disclosure, the electronic device 101 may previously activate the at least one determined fingerprint recognition sensor. According to an embodiment of the present disclosure, the electronic device 101 may previously activate the fingerprint recognition sensor based on a specific state (e.g., at least one of the state in which an application requiring the fingerprint recognition function is in operation and the case where a touch or proximity signal is input through at least one sensor in the sleep mode or in the lock screen state).

The electronic device 101 may detect a fingerprint through at least one of the activated fingerprint recognition sensors. The electronic device 101 may determine comparison group information based on the fingerprint recognition sensor through which the fingerprint has been detected. According to an embodiment of the present disclosure, when the electronic device 101 detects a fingerprint through the fingerprint recognition region 811 while the user holds the electronic device 101 with his/her left hand, the electronic device 101 may determine that the user has input the fingerprint of his/her left hand thumb. The electronic device 101 may determine, as the comparison group information, the fingerprint image of the left hand thumb or the category to which the fingerprint image of the left hand thumb belongs and may compare the determined comparison group of fingerprint images with the fingerprint detected through the fingerprint recognition region 811. According to another embodiment of the present disclosure, when the electronic device 101 detects a fingerprint through the fingerprint recognition region 811 while the user holds the electronic device 101 with his/her left hand, the electronic device 101 may determine that the user has input the fingerprint of his/her left hand thumb or any of his/her right hand fingers, may determine, as the comparison group information, the reference fingerprint image of the left hand thumb, reference fingerprint images of the right hand fingers, or the category to which the reference fingerprint images belong, and may compare the determined comparison group of reference fingerprint images with the fingerprint detected through the fingerprint recognition region 811.

Figure 9:
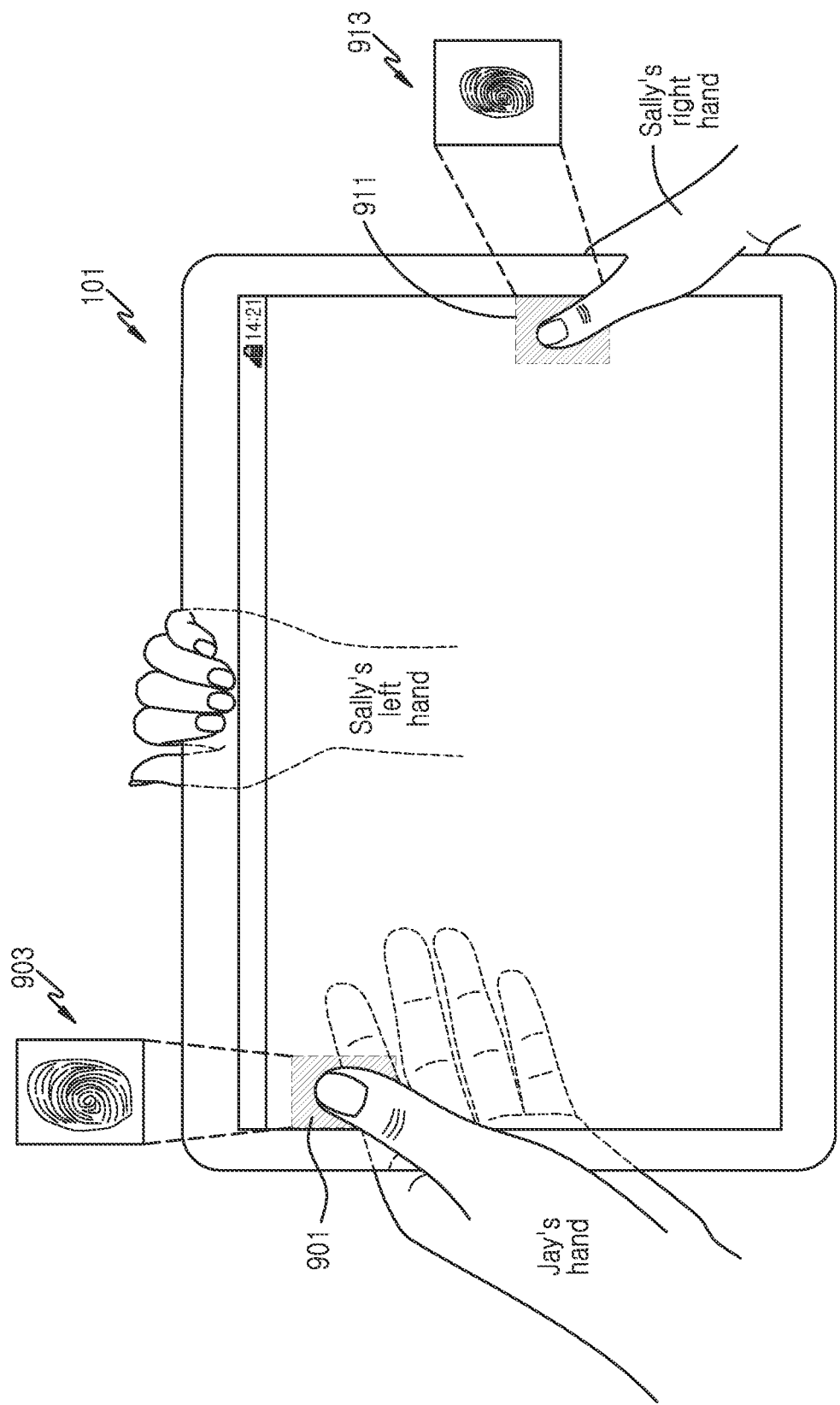
FIG. 9 illustrates processing a detected fingerprint based on information on a situation in which an electronic device comes in contact with a user's body in the electronic device according to various embodiments of the present disclosure.

FIG. 9 illustrates processing a detected fingerprint based on information on a situation in which an electronic device comes in contact with a user's body in the electronic device according to various embodiments of the present disclosure.

Referring to FIG. 9, the electronic device 101 may determine information on a grip pattern of the electronic device 101 through at least one sensor disposed in the edge region or on a rear surface of the electronic device 101. The electronic device may determine a user's hand with which the user holds the electronic device based on information set in advance. According to an embodiment of the present disclosure, when at least a part of the contact area of a user's body that comes in contact with the sensor disposed in the edge region or on the rear surface of the electronic device 101 is larger than the area of a predetermined region, the electronic device 101 may determine that the user holding the electronic device 101 with his/her hand is an adult. In addition, when the size of a fingerprint input through the fingerprint recognition sensor is larger than a predetermined size, the electronic device 101 may determine that an adult has input his/her fingerprint.

According to an embodiment of the present disclosure, the electronic device 101 may include, as the information set in advance, information on the grip pattern of Jay who is an adult, Jay's fingerprints, information on the grip pattern of Sally who is a child, and Sally's fingerprints. Based on the grip pattern at a time when a fingerprint is recognized, the electronic device 101 may determine that Jay or Sally holds the electronic device 101 with his or her hand. According to an embodiment of the present disclosure, when the electronic device 101 determines that Sally holds the electronic device 101 with her hand, the electronic device 101 may compare a fingerprint 913 detected through the fingerprint recognition region 911 with Sally's fingerprints determined as comparison group information. According to another embodiment of the present disclosure, based on a fingerprint 903 that is input through a fingerprint recognition region 901, the electronic device 101 may determine that the detected fingerprint 903 corresponds to that of an adult and may determine, as comparison group information, Jay's fingerprints that are set as adults' fingerprints. The electronic device 101 may compare the detected fingerprint 903 with Jay's fingerprints according to the determined comparison group information. According to another embodiment of the present disclosure, when a fingerprint is detected through the fingerprint recognition sensor 901 activated in the left edge region of the display 150 while a user holds the electronic device 101 with his/her left hand as Jay's hand shown in FIG. 9, the electronic device 101 may include fingerprint images corresponding to Jay's left hand fingers in comparison group information (or a higher priority of comparison group information).

Figure 10:
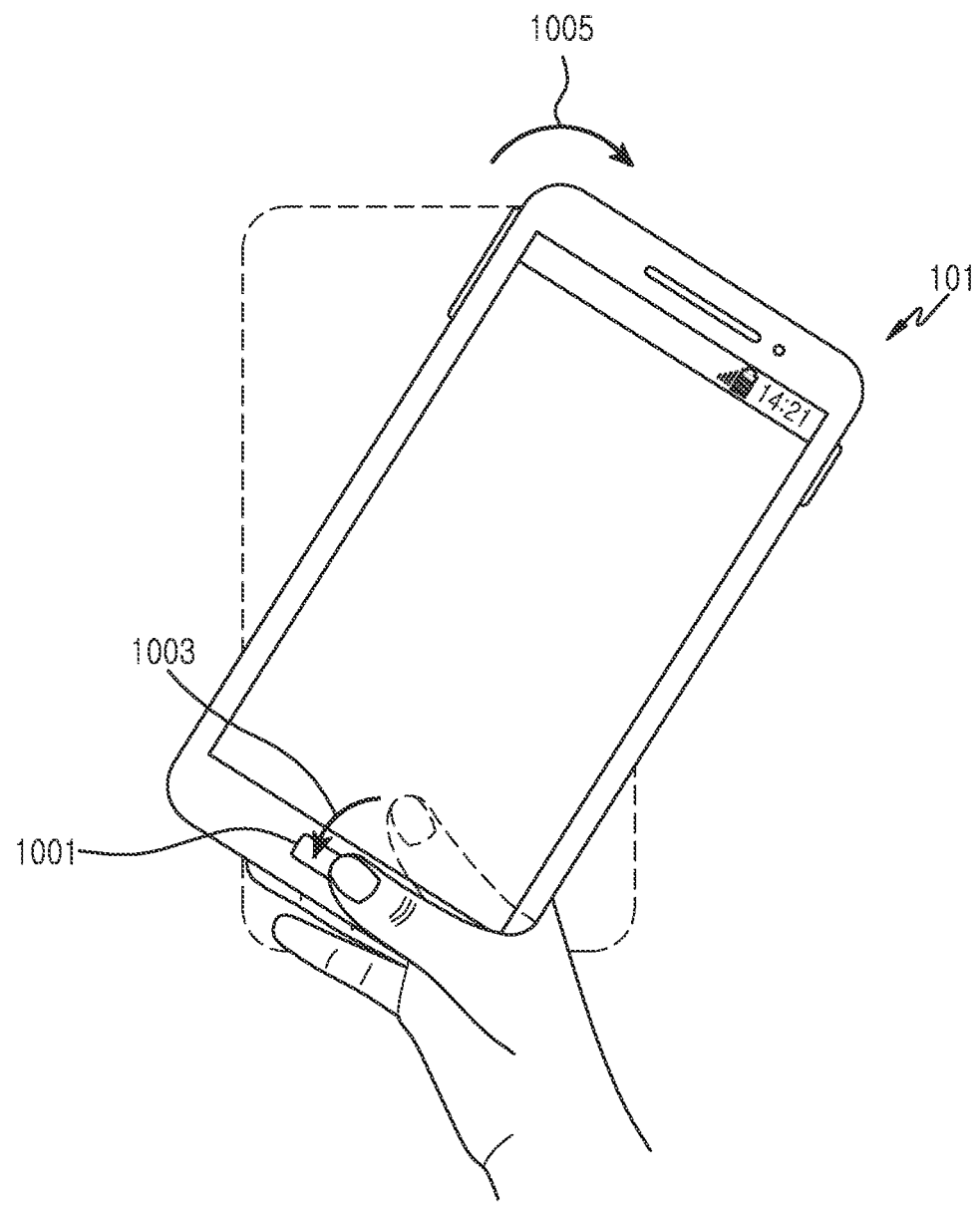
FIG. 10 illustrates processing a detected fingerprint based on a movement of an electronic device at a time when the fingerprint is detected in the electronic device according to various embodiments of the present disclosure.

FIG. 10 illustrates processing a detected fingerprint based on a movement of an electronic device at a time when the fingerprint is detected in the electronic device according to various embodiments of the present disclosure.

Referring to FIG. 10, the electronic device 101 may acquire information on the movement of the electronic device 101 using at least one sensor (e.g., an acceleration sensor, a gyroscope, a geomagnetic sensor, a gesture sensor, or a proximity sensor) included therein.

According to an embodiment of the present disclosure, the information on the movement of the electronic device 101 may be a static posture state (e.g., pitch, yaw, or roll information) of the electronic device 101 or may be a dynamic state of the electronic device 101, such as a rotation, a tilt, a motion, or a gesture. According to another embodiment of the present disclosure, the information on the movement of the electronic device 101 may include both the static posture state and the dynamic state.

The electronic device 101 may acquire information on the movement of the electronic device 101 at a time when detecting a fingerprint through a fingerprint recognition sensor 1001. The electronic device 101 may determine comparison group information based on movement information of the electronic device 101, which is acquired at a time when or has been acquired within a predetermined period of time before a fingerprint is detected through the fingerprint recognition sensor 1001.

According to an embodiment of the present disclosure, the electronic device 101 acquire information on the movement of the electronic device 101, which occurs at a time when or has occurred within a predetermined period of time before a fingerprint is detected by a user's action of swiping the fingerprint side of his/her finger over the fingerprint recognition sensor or touching the fingerprint recognition sensor with the fingerprint side of the his/her finger. For example, within a predetermined period of time before a fingerprint is detected through the fingerprint recognition sensor, the electronic device may detect a situation 1005 in which the electronic device 101 that is in the vertical mode is rotated to the right with respect to the front surface (e.g., the surface on which the display 150 is disposed).

According to another embodiment of the present disclosure, at a time when a fingerprint is detected through the fingerprint recognition sensor, the electronic device 101 may detect the posture of the terminal in which the electronic device 101 that is in the vertical mode is tilted to the right with respect to the front surface (e.g., the surface on which the display 150 is disposed).

According to various embodiments of the present disclosure, the electronic device 101 may determine that the situation 1005 corresponds to the situation in which a user inputs his/her fingerprint by swiping his/her finger in a defined direction 1003 over the fingerprint recognition sensor 1001 while holding the electronic device 101 with his/her right hand. In determining comparison group information for a comparison with the detected fingerprint, the electronic device 101 may determine, as the comparison group information, fingerprint images corresponding to fingerprints (e.g., thumb fingerprint) that have been input while a user holds the electronic device 101 with his/her right hand, as is the case of the fingerprint image 410 in FIG. 4. According to an embodiment of the present disclosure, when the electronic device 101 is rotated in the opposite direction to the direction 1005, the electronic device 101 may determine that a user inputs the fingerprint of his/her left hand thumb while holding the electronic device 101 with his/her left hand and may determine the fingerprint image corresponding to the left hand thumb as comparison group information. It will be apparent to those skilled in the art that the electronic device 101 is not limited to the swipe type fingerprint recognition sensor 1001, and various embodiments of the present disclosure may be applied to a fingerprint that is detected through a touch type fingerprint recognition sensor linked to the display 150 or mounted on the bezel region or a key.

Figure 11:
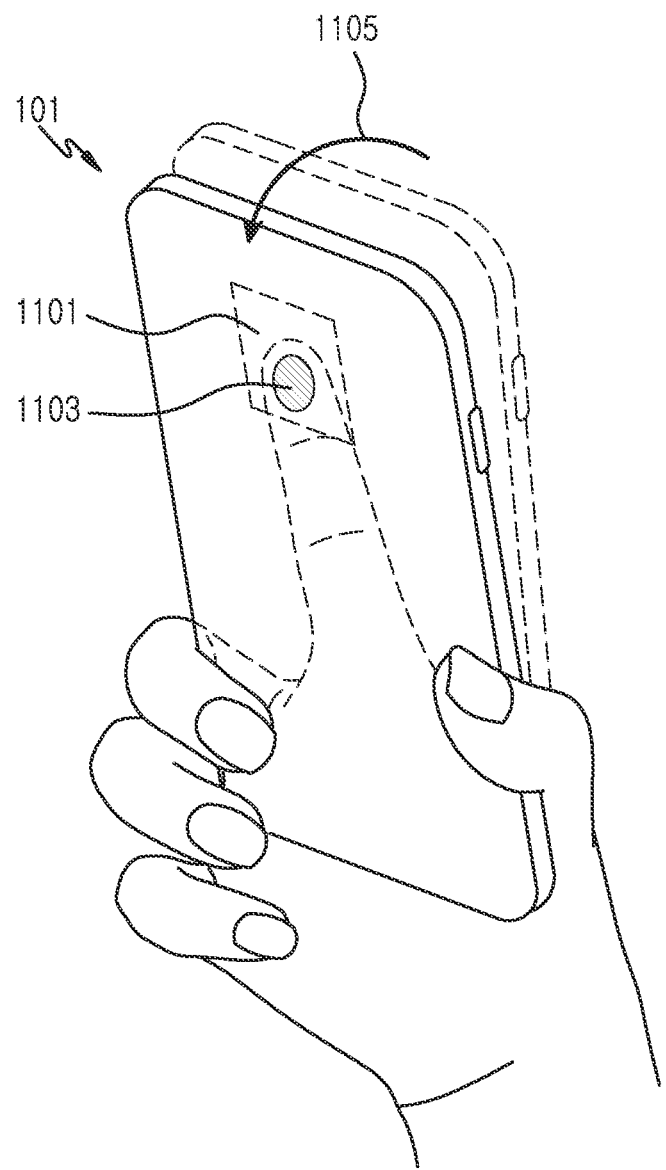
FIG. 11 illustrates processing a detected fingerprint based on a movement of an electronic device at a time when the fingerprint is detected in the electronic device according to various embodiments of the present disclosure.

FIG. 11 illustrates processing a detected fingerprint based on a movement of an electronic device at a time when the fingerprint is detected in the electronic device according to various embodiments of the present disclosure.

Referring to FIG. 11, the electronic device 101 may include, in a predetermine location (e.g., a rear surface of the electronic device 101), a touch type fingerprint recognition sensor 1101 that detects a fingerprint by a user's action of touching the fingerprint recognition sensor 1101 with the fingerprint side of his/her finger. The electronic device 101 may detect a fingerprint 1103 of a user's finger that touches the touch type fingerprint recognition sensor 1101 disposed on the rear surface of the electronic device 101 while the user holds the electronic device 101 with his/her hand. At a time when a fingerprint is detected, the electronic device 101 may determine a situation 1105 in which the electronic device 101 is tilted in the direction of the front surface of the electronic device 101 where the display 150 is disposed. When the electronic device 101 determines the situation 1105, the electronic device 101 may determine, as comparison group information, fingerprint images that have been input through the fingerprint recognition sensor disposed on the rear surface of the electronic device 101 or the category to which the fingerprint images belong.

Figure 12:
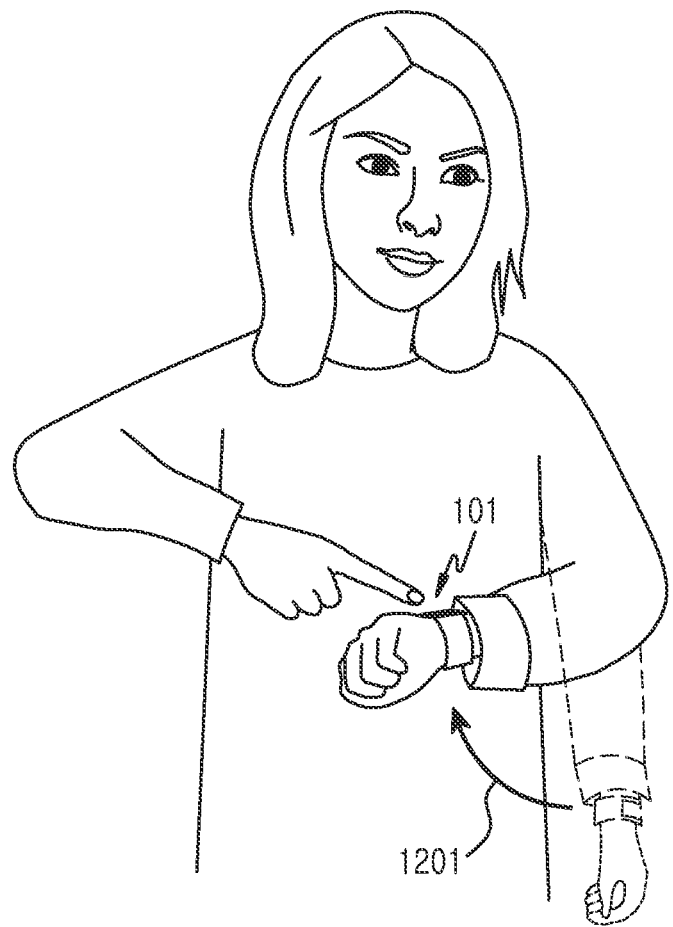
FIG. 12 illustrates processing a detected fingerprint based on a movement of an electronic device in the electronic device according to various embodiments of the present disclosure.

FIG. 12 illustrates processing a detected fingerprint based on a movement of an electronic device in the electronic device according to various embodiments of the present disclosure.

Referring to FIG. 12, the electronic device 101 may determine the wearing pattern of the electronic device 101 through the movement of the electronic device 101 in a fingerprint detection mode. According to an embodiment of the present disclosure, the electronic device 101 may be a wearable electronic device (e.g., device in the form of a wristwatch). According to an embodiment of the present disclosure, a user who wears the electronic device 101 on his/her left wrist may set, in advance, information indicating that the electronic device 101 is worn on his/her left wrist, and subsequently when a fingerprint is input, the electronic device 101 may determine that the input fingerprint is a fingerprint corresponding to any of the user's right hand fingers. The electronic device 101 may determine, as comparison group information, fingerprint images registered as the fingerprints of the right hand fingers or the category to which the fingerprint images registered as the fingerprints of the right hand fingers belong and may compare the detected fingerprint detected by the electronic device 101 with the fingerprint images according to the determined comparison group information.

According to an embodiment of the present disclosure, when a user wears the electronic device 101 on his/her left wrist, the electronic device 101 may detect a user's action 1201 of raising his/her left wrist, on which the electronic device 101 is worn, in order to input a fingerprint with any of his/her right hand fingers. The electronic device 101 may acquire information corresponding to the user's action of raising his/her left wrist through at least one sensor (e.g., an acceleration sensor, a geomagnetic sensor, or a gesture sensor) included therein. The electronic device 101 may determine, based on the acquired information, that the user wears the electronic device 101 on his/her left wrist. For example, since a person's left and right arms are different, due to their joint structures, in the area and direction in which he/she may move the corresponding arm, the electronic device 101 may determine on which wrist the user wears the electronic device by identifying such a difference. The electronic device 101 may determine that the input fingerprint is a fingerprint corresponding to any of the user's right hand fingers. The electronic device 101 may determine, as comparison group information, fingerprint images registered as the fingerprints of the right hand fingers or the category to which the fingerprint images registered as the fingerprints of the right hand fingers belong and may compare the detected fingerprint detected by the electronic device 101 with the fingerprint images according to the determined comparison group information.

Figure 13:
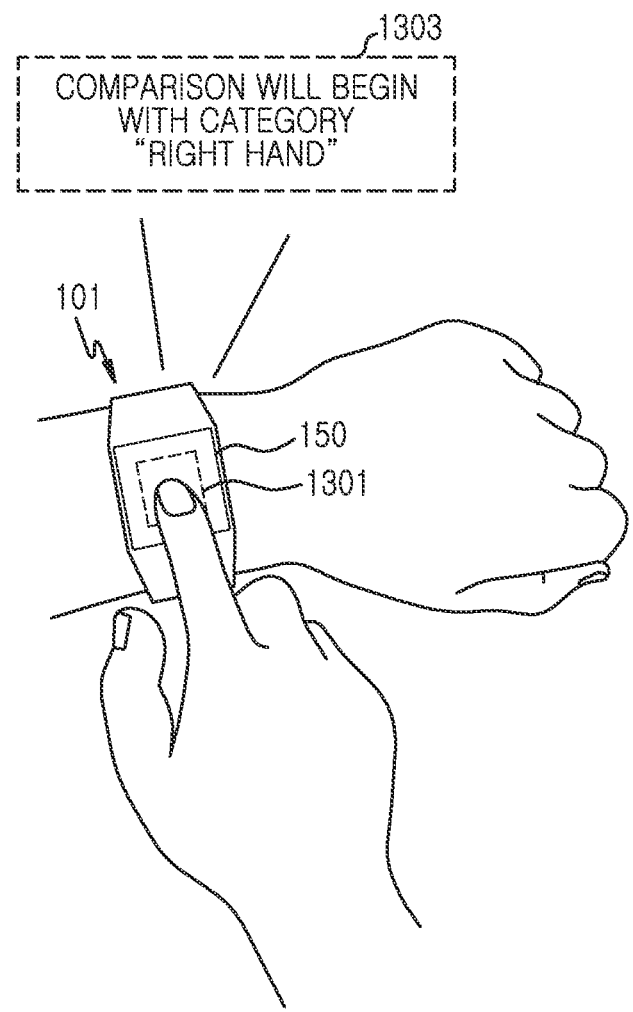
FIG. 13 illustrates processing a detected fingerprint based on a movement of an electronic device in the electronic device according to various embodiments of the present disclosure.

FIG. 13 illustrates processing a detected fingerprint based on a movement of an electronic device in the electronic device according to various embodiments of the present disclosure.

Referring to FIG. 13, the electronic device 101 may include at least one sensor (e.g., a biometric sensor such as a sensor for detecting blood flow waves, a pulse wave sensor, or an electrocardiogram (ECG) sensor) functionally connected to each other. According to an embodiment of the present disclosure, the electronic device 101 may be worn on a user's left wrist. Based on information acquired from blood vessels located in the left wrist of the user wearing the electronic device 101, the electronic device 101 may determine that the user wears the electronic device on his/her left wrist and may determine that a fingerprint input into the electronic device 101 corresponds to any of the user's right hand fingers. For example, even for the same user, the strength of a signal input through the biometric sensor when the user wears the electronic device 101 on his/her left wrist and the strength of a signal through the biometric sensor when the user wears the electronic device 101 on his/her right wrist may be different depending on their vascularity. Accordingly, the electronic device 101 may determine an input position through the signal strength that has been measured in advance for each wearing location.

The electronic device 101 may determine, as comparison group information, fingerprint images corresponding to the fingerprints input using the right hand fingers or the category to which fingerprint images corresponding to the fingerprints input using the right hand fingers belong and may compare a fingerprint detected through a fingerprint recognition region 1301 linked to the display 150 with the fingerprint images according to the comparison group information. The electronic device 101 may output information 1303 corresponding to the fingerprint images included in the comparison group information.

Figure 14:
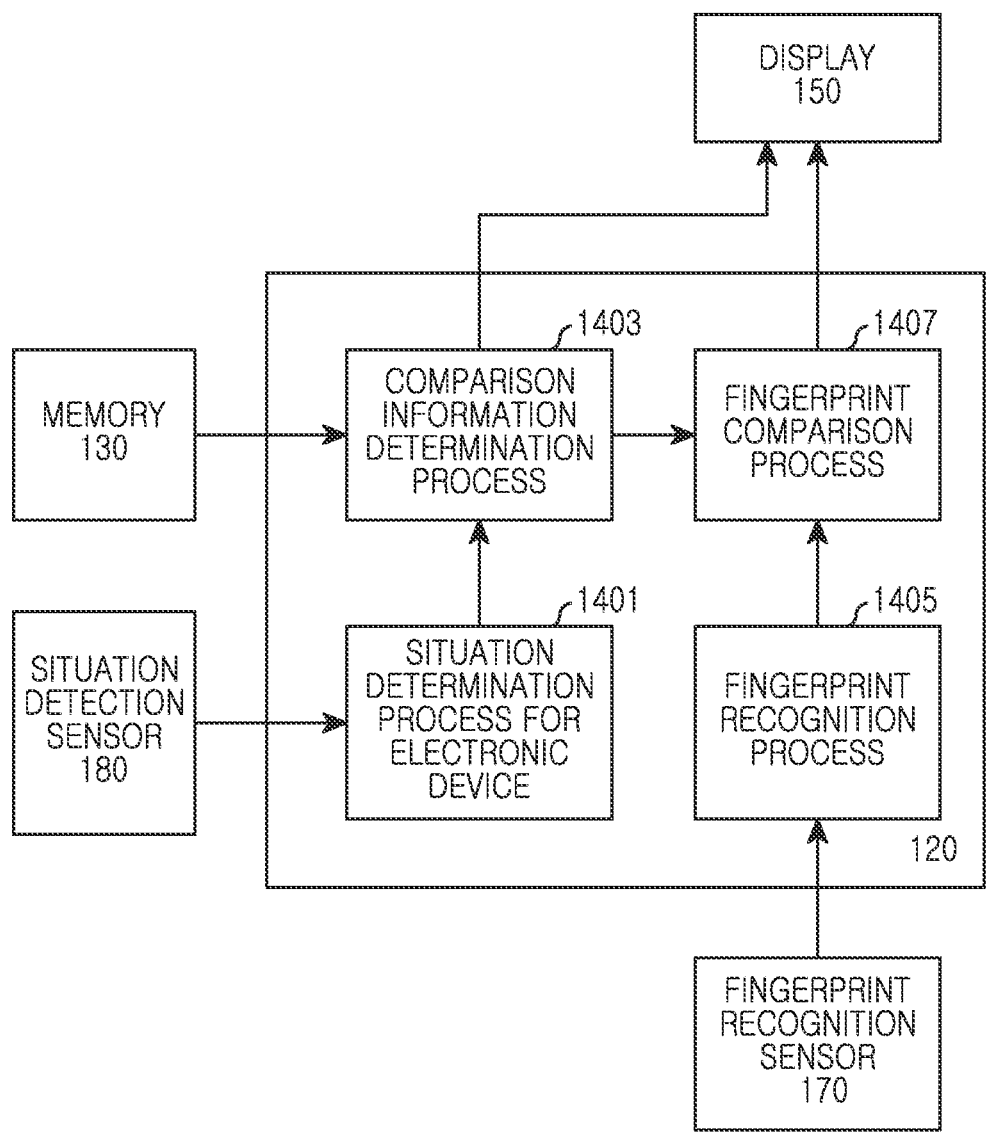
FIG. 14 illustrates an operation of a processor in an electronic device for implementing various embodiments of the present disclosure according to various embodiments of the present disclosure.

FIG. 14 illustrates an operation of a processor in an electronic device for implementing various embodiments of the present disclosure.

Referring to FIG. 14, the electronic device 101 may control at least one unit, functionally connected to each other, through the processor 120 and may implement various embodiments of the present disclosure based on information set therein. In a situation determination process 1401, the processor 120 may determine a situation regarding the posture (e.g. motion) or movement of the electronic device 101 through at least one sensor (e.g., the situation detection sensor 180) included in the electronic device 101. The situation detection sensor 180 may include at least one of the sensors included in the sensor module 240 of the electronic device 101.

In a comparison information determination process 1403, the processor 120 may determine, based on situation information of the electronic device 101, comparison group information for a comparison with a fingerprint detected through the fingerprint recognition sensor 170 of the electronic device 101. According to an embodiment of the present disclosure, the processor 120 may determine the comparison group information through the situation information that has been determined based on various pieces of information such as the grip pattern of the electronic device 101, the activation state of the fingerprint recognition sensor included in the electronic device 101, motion information of the electronic device 101, and movement information of the electronic device 101 in the situation determination process 1401. The processor 120 may output information on the determined comparison group information in the electronic device 101 (e.g., may display the information on the display 150).

In a fingerprint recognition process 1405, the processor 120 may detect a user's fingerprint through the fingerprint recognition sensor 170. The electronic device 101 may include at least one fingerprint recognition sensor 170, and the processor 120 may compare the fingerprint detected through the fingerprint recognition sensor 170 with previously input fingerprint images included in at least one of the memory 130 of the electronic device 101, the memory (not shown) of the external electronic device 102, the memory (not shown) of the external electronic device 104, and the memory (not shown) of the server 106 or fingerprint images stored in at least one of the above memories.

In a fingerprint comparison process 1407, the processor 120 may compare the fingerprint detected through the fingerprint recognition sensor 170 with fingerprint images corresponding to the comparison group information determined in the comparison information determination process 1403. Based on the fingerprint images corresponding to the comparison group information, the processor 120 may determine the reference fingerprint image that has been collected in the same situation as or in the most similar situation to the detected fingerprint or the fingerprint image that includes the same region as or a similar region to the specified feature region of the detected fingerprint. As used herein, the specified feature region of the detected fingerprint may be a region where feature points such as ridges having a unique shape or pattern are located. Alternatively, any partial region of the fingerprint may also be set as the feature region by a user selection. When the electronic device 101 detects a fingerprint through the fingerprint recognition sensor 170, the processor 120 may determine a feature region in the detected fingerprint image and compare the feature region with the corresponding feature region of each fingerprint image included in the comparison group. The processor 120 may output the result of the comparison through the display 150.

According to various embodiments of the present disclosure, the processor 120 may determine comparison reference value information based on situation information at a time when a fingerprint is detected and may recognize a fingerprint corresponding to the detected fingerprint according to the comparison reference value information. The comparison reference value information may be a database (e.g., profile such as a user profile or a user group profile) that is specified to predict the corresponding fingerprint inputting style according to whether the electronic device 101 is in the vertical mode or in the horizontal mode, according to the locations of the electronic device 101 where a user holds the electronic device 101 with his/her hand, or according to the user who holds the electronic device 101 with his/her hand, and may include at least a part of comparison group information. The processor 120 may determine a predefined mode as the situation information based on at least one of information on the motion of the electronic device, information on the posture of the electronic device, and information on the movement of the electronic device or based on the motion, posture, and movement of the electronic device. The processor 120 may acquire the information on the motion of the electronic device, the information on the posture of the electronic device, or the information on the movement of the electronic device through at least one of an acceleration sensor, a tilt sensor, a gesture sensor, a gyro sensor, a grip sensor, a touch sensor, a light sensor, and a biometric sensor included in the electronic device. The processor 120 may determine, as the situation information, information on the orientation of the hand grasping the electronic device or information on the position where the electronic device is worn on a user's body. The processor 120 may determine the orientation of the grasping hand or the wearing position of the electronic device based on the movement of the electronic device through at least one of an acceleration sensor, a tilt sensor, a gesture sensor, a gyro sensor, a grip sensor, a touch sensor, a light sensor, and a biometric sensor included in the electronic device or based on a biometric sensor included in the electronic device. The processor 120 may allow the situation information to include information determined for the orientation of a user's hand with which the user inputs the detected fingerprint. The processor 120 may determine the information determined for the orientation of a user's hand based on information on the motion, posture, or movement of the electronic device. The processor 120 may allow the comparison reference value to include information on images of at least one fingerprint stored before the detection time of the fingerprint or information on at least one category including the fingerprint images. According to an embodiment of the present disclosure, in the case of a swipe type fingerprint recognition sensor, the processor 120 may identify the category based on at least one of the direction in which a user swipes his/her finger, the orientation of a user's hand with which the user inputs a fingerprint, and the finger of which fingerprint is input. In the case of a touch type fingerprint recognition sensor, the processor 120 may identify the category based on at least one of the orientation of the fingertip, the orientation of a user's hand with which the user inputs a fingerprint, and the finger of which fingerprint is input. According to another embodiment of the present disclosure, in the case of a touch type fingerprint recognition sensor, the processor 120 may identify the category based on at least one of the orientation of the fingertip, the orientation of a user's hand with which the user inputs a fingerprint, and the finger of which fingerprint is input. The processor 120 may determine the priorities of the fingerprint images or the categories and may allow the comparison reference value information to include the determined priorities.

The various embodiments of the present disclosure that have been described above as being implemented by the electronic device 101 may be implemented through the operation of the processor as in FIG. 14 or may be implemented through a module (e.g., MCU) specified to perform operations according to various embodiment of the present disclosure. It will be apparent that this is also the same for the various embodiments of the present disclosure that are described below as being implemented by the electronic device 101 or the processor 120.

Figure 15:
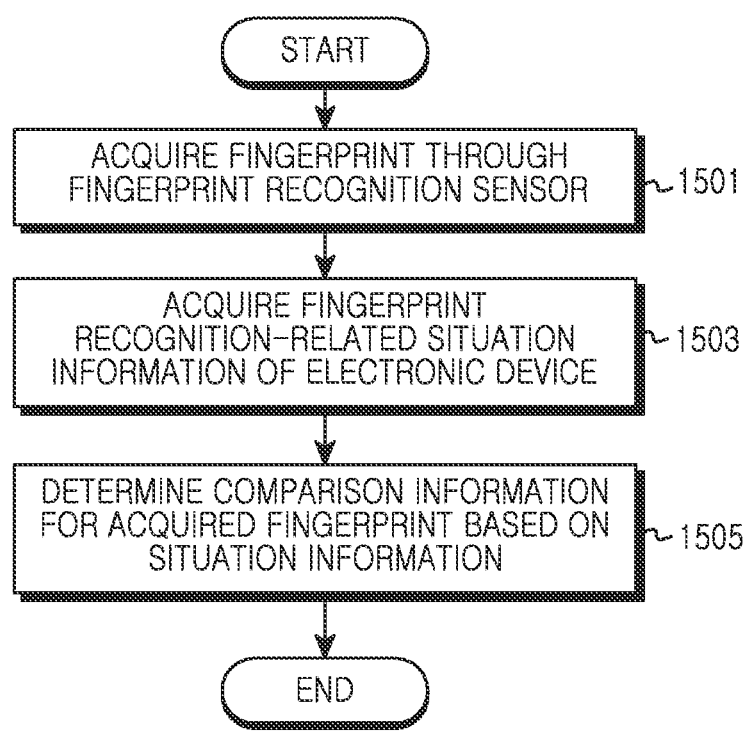
FIG. 15 is a flowchart illustrating an operation of comparing a detected fingerprint with a comparison group of fingerprints based on situation information in an electronic device for implementing various embodiments of the present disclosure according to various embodiments of the present disclosure.

FIG. 15 is a flowchart illustrating an operation of comparing a detected fingerprint with a comparison group of fingerprints based on situation information in an electronic device for implementing various embodiments of the present disclosure.

Referring to FIG. 15, in operation 1501, the electronic device 101 may detect a fingerprint corresponding to at least one finger through the fingerprint recognition sensor 170. In detecting a fingerprint, the electronic device 101 may detect the fingerprint through various types of fingerprint recognition sensors included in the electronic device 101, such as a swipe type fingerprint recognition sensor, a touch type fingerprint recognition sensor, and a fingerprint recognition sensor that is linked to the display so as to acquire a fingerprint from the fingerprint side of a finger touching the display 150.

In operation 1503, the electronic device 101 may acquire situation information of the electronic device 101 at the time of fingerprint recognition. According to another embodiment of the present disclosure, the electronic device 101 may use situation information that has occurred within a predetermined period of time before the time of fingerprint recognition. That is, the electronic device 101 may use movement information that has occurred before the time of fingerprint recognition.

The time of fingerprint recognition may refer to the time when the fingerprint is detected through the fingerprint recognition sensor 170, the fingerprint detection mode in which the fingerprint is detected, or the security authentication mode in which a security authentication procedure is performed based on the detected fingerprint. At the time the fingerprint is detected, the electronic device 101 may acquire information on the motion of the electronic device 101, the posture of the electronic device 101, or the movement of the electronic device 101 through at least one sensor included in the electronic device 101 and may determine at least one predefined situation based on the acquired information.

In operation 1505, the electronic device 101 may determine, based on the determined situation information of the electronic device 101, comparison group information for a comparison with the fingerprint detected through the fingerprint recognition sensor 170 of the electronic device 101. The electronic device 101 may store at least one fingerprint image in at least one of the memory 130, the memory (not shown) of the external electronic device 102, the memory (not shown) of the external electronic device 104, and the memory (not shown) of the server 106 or may classify the fingerprint images into at least one category according to the feature of the fingerprint included in each fingerprint image or the acquisition type of each fingerprint image. The electronic device 101 may determine, as comparison group information, a fingerprint image or category specified based on the situation information.

In addition, the electronic device 101 may compare the fingerprint acquired through the fingerprint recognition sensor 170 with the specified fingerprint image or fingerprint images belonging to the specified category according to the comparison group information. The electronic device 101 may compare the detected fingerprint with fingerprint images according to the priorities of the comparison group information. That is, when the electronic device 101 fails to determine the same fingerprint image as the detected fingerprint, the electronic device 101 may compare the detected fingerprint with fingerprint images corresponding to the next lower priority of the comparison group information or the fingerprint images stored in the memory.

According to an embodiment of the present disclosure, the fingerprint images stored in the memory may include the reference fingerprint that has been input at the time of fingerprint registration. According to various embodiments of the present disclosure, the reference fingerprint may be updated with a fingerprint of the same finger of which fingerprint has been input for the security authentication procedure.

Upon completing operation 1505, the electronic device 101 may end the embodiment of the present disclosure shown in FIG. 15.

Various embodiments of the present disclosure implemented by the electronic device 101 may be operations that are performed under the control of the processor 120. In addition to the processor 120, the electronic device 101 may include a separate module that is programmed to control various embodiment of the present disclosure. The separate module programmed to control various embodiments of the present disclosure may also be operated under the control of the processor 120.

According to various embodiments of the present disclosure, since a comparison group to be compared with a detected fingerprint is determined using such information as the grip pattern of an electronic device, the direction of an electronic device, or the movement of an electronic device, an increase in the speed of authentication processing through fingerprint recognition may be expected. Further, since a user's finger of which fingerprint is not likely to be recognized is identified and the corresponding fingerprint is excluded from fingerprints to be compared with a detected fingerprint, there is little probability of misrecognizing the fingerprint of an unauthorized user as that of an authorized user.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

According to various embodiments of the present disclosure, at least some of the devices or methods according to various embodiment of the present disclosure as defined by the appended claims and/or disclosed herein may mean devices or methods in the form of hardware, software, firmware, or any combination (e.g., module or unit) of at least two of hardware, software, and firmware or may be implemented in the form of hardware, software, firmware, or any combination (e.g., module or unit) of at least two of hardware, software, and firmware. The "module" may, for example, be interchangeably used with the term "unit", "logic", "logical block", "component", or "circuit". The "module" may be the smallest unit of an integrated component or a part thereof. Further, the "module" may be the smallest unit that performs one or more functions in various embodiments of the present disclosure. The "module" may be mechanically or electronically implemented. For example, the "module" according to various embodiments of the present disclosure may include at least one of an application-specific integrated circuit (ASIC) chip, a field-programmable gate arrays (FPGA), and a programmable-logic device for performing certain operations, which are now known or will be developed in the future. Further, the "module" may be provided as a computer readable storage medium (or storage medium readable by a computer) storing at least one program (or programming module or application). The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. The instructions, when executed by at least one processor (e.g., the processor 120), enables the at least one processor to perform functions corresponding to the instructions. The computer readable storage medium may, for example, be the memory 130 or 230. At least a part of the programming module may, for example, be implemented (e.g., executed) by the processor 120 or 210. At least a part of the programming module may, for example, include a module, a program, a routine, a set of instructions, or a process for performing at least one function.

The computer-readable storage medium may include magnetic media such as a hard disc, a floppy disc, and a magnetic tape; optical media such as a compact disc read only memory (CD-ROM) and a DVD; magneto-optical media such as a floptical disk; a hardware device specifically configured to store and execute program instructions (e.g., programming module), such as a ROM, a RAM, and a flash memory; an EEPROM; a magnetic disc storage device; any other type of optical storage device; and a magnetic cassette. Alternatively, any combination of some or all thereof may form a memory in which the program is stored. Further, a plurality of such memories may be included in the electronic device.

In addition, the program may be stored in an attachable storage device capable of accessing the electronic device through a communication network such as the Internet, an intranet, a LAN, a wide LAN (WLAN), a storage area network (SAN), or any combination thereof. Such a storage device may access the electronic device via an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   determining situation information of the electronic device when the electronic device detects a fingerprint;
   selecting, based on the situation information, a comparison group of fingerprints which is a subset of a plurality of fingerprints stored in the electronic device; and
   performing a fingerprint recognition based on the detected fingerprint and the selected comparison group of fingerprints,
   wherein the situation information comprises information on an orientation of a hand grasping the electronic device or information on a position of a user's body where the electronic device is worn.

2. The method of claim 1,
   wherein the situation information further comprises at least one of information on a motion of the electronic device, information on a posture of the electronic device, and information on a movement of the electronic device, or
   wherein the situation information further comprises information on a mode specified based on the motion, posture, and movement of the electronic device.

3. The method of claim 2, wherein the information on the motion of the electronic device, the information on the posture of the electronic device, or the information on the movement of the electronic device is acquired through at least one of an acceleration sensor, a tilt sensor, a gesture sensor, a gyro sensor, a grip sensor, a touch sensor, a light sensor, or a biometric sensor included in the electronic device.

4. The method of claim 1, wherein the information on the orientation of the grasping hand or the wearing position is determined based on the movement of the electronic device, acquired through at least one of an acceleration sensor, a tilt sensor, a gesture sensor, a gyro sensor, a grip sensor, a touch sensor, a light sensor, and a biometric sensor included in the electronic device or based on a biometric sensor included in the electronic device.

5. The method of claim 1, wherein the situation information further comprises information determined for an orientation of a user's hand with which the user inputs the detected fingerprint.

6. The method of claim 5, wherein the information determined for the orientation of the user's hand is determined based on information on a motion, a posture, or a movement of the electronic device.

7. The method of claim 1,
   wherein the selecting of the comparison group of fingerprints is further based on a fingerprint category,
   wherein, when a swipe type fingerprint recognition sensor is used, the fingerprint category is identified based on at least one of a direction in which a user swipes his/her finger, an orientation of a user's hand with which the user inputs the fingerprint, and a finger of which the fingerprint is input, and
   wherein, when a touch type fingerprint recognition sensor is used, the fingerprint category is identified based on at least one of an orientation of a fingertip, the orientation of the user's hand with which the user inputs the fingerprint, and a finger of which the fingerprint is input.

8. An electronic device comprising:
   a fingerprint recognition sensor configured to detect a fingerprint; and
   a processor configured to:
     determine situation information of the electronic device when the electronic device detects a fingerprint,
     select, based on the situation information, a comparison group of fingerprints which is a subset of a plurality of fingerprints stored in the electronic device, and
     perform a fingerprint recognition based on the detected fingerprint and the selected comparison group of fingerprints,
   wherein the situation information comprises information on an orientation of a hand grasping the electronic device or information on a position of a user's body where the electronic device is worn.

9. The electronic device of claim 8, wherein the processor is further configured to determine, as the situation information, at least one of information on a motion of the electronic device, information on a posture of the electronic device, or information on a movement of the electronic device or comprises information on a mode specified based on a motion, a posture, and a movement of the electronic device.

10. The electronic device of claim 9, wherein the processor is further configured to acquire the information on the motion of the electronic device, the information on the posture of the electronic device, or the information on the movement of the electronic device through at least one of an acceleration sensor, a tilt sensor, a gesture sensor, a gyro sensor, a grip sensor, a touch sensor, a light sensor, or a biometric sensor included in the electronic device.

11. The electronic device of claim 8, wherein the processor is further configured to determine the information on the orientation of the grasping hand or the wearing position, based on the movement of the electronic device, acquired through at least one of an acceleration sensor, a tilt sensor, a gesture sensor, a gyro sensor, a grip sensor, a touch sensor, a light sensor, or a biometric sensor included in the electronic device or based on a biometric sensor included in the electronic device.

12. The electronic device of claim 8, wherein the processor is further configured to allow the situation information to include information determined for an orientation of a user's hand with which the user inputs the detected fingerprint.

13. The electronic device of claim 12, wherein the processor is further configured to determine the information determined for the orientation of the user's hand, based on information on a motion, posture, or movement of the electronic device.

14. The electronic device of claim 8,
wherein the processor is further configured to select the comparison group of fingerprints based on a fingerprint category,
wherein, when a swipe type fingerprint recognition sensor is used, the processor is further configured to identify the fingerprint category, based on at least one of a direction in which a user swipes his/her finger, an orientation of a user's hand with which the user inputs the fingerprint, or a finger of which the fingerprint is input, and
wherein, when a touch type fingerprint recognition sensor is used, the processor is further configured to identify the fingerprint category, based on at least one of an orientation of a fingertip, the orientation of the user's hand with which the user inputs the fingerprint, or a finger of which the fingerprint is input.

15. An electronic device comprising:
a fingerprint recognition sensor configured to detect a fingerprint; and
a processor configured to:
   in response to determining that a fingerprint for storing a reference value is detected,
     determine situation information of the electronic device when the electronic device detects a fingerprint for storing a reference value, and
     store the reference value with the situation information of the electronic device in a memory of the electronic device, and
   in response to determining that a fingerprint for performing a fingerprint recognition,
     determine situation information of the electronic device when the electronic device detects a fingerprint,
     select a reference value, from among a plurality of reference values stored in the memory of the electronic device, based on the situation information of the electronic device,
     select, based on the reference value, a comparison group of fingerprints which is a subset of a plurality of fingerprints stored in the electronic device, and
     perform the fingerprint recognition based on the detected fingerprint and the selected comparison group of fingerprints,
wherein the situation information comprises information on an orientation of a hand grasping the electronic device or information on a position of a user's body where the electronic device is worn.

* * * * *